United States Patent
Gao et al.

(10) Patent No.: US 10,542,262 B2
(45) Date of Patent: Jan. 21, 2020

(54) SYSTEMS AND METHODS FOR RATE CONTROL IN VIDEO CODING USING JOINT MACHINE LEARNING AND GAME THEORY

(71) Applicant: City University of Hong Kong, Kowloon (HK)

(72) Inventors: Wei Gao, Kowloon (HK); Tak Wu Sam Kwong, Kowloon (HK)

(73) Assignee: City University of Hong Kong, Kowloon (HK)

( * ) Notice: Subject to any disclaimer, the term of this patent is extended or adjusted under 35 U.S.C. 154(b) by 183 days.

(21) Appl. No.: 15/352,222

(22) Filed: Nov. 15, 2016

(65) Prior Publication Data

US 2018/0139450 A1 May 17, 2018

(51) Int. Cl.
*H04N 19/147* (2014.01)
*H04N 19/124* (2014.01)
(Continued)

(52) U.S. Cl.
CPC ......... *H04N 19/147* (2014.11); *H04N 19/124* (2014.11); *H04N 19/159* (2014.11); *H04N 19/172* (2014.11); *H04N 19/176* (2014.11)

(58) Field of Classification Search
CPC .. H04N 19/147; H04N 19/124; H04N 19/159; H04N 19/172; H04N 19/176
(Continued)

(56) References Cited

U.S. PATENT DOCUMENTS 7,349,472 B2 * 3/2008 Vetro .................. H04N 19/176
375/240.03
8,295,343 B2 10/2012 Tong et al.
(Continued)

FOREIGN PATENT DOCUMENTS

EP 1835750 A1 9/2007
EP 2014098 A2 1/2009
(Continued)

OTHER PUBLICATIONS

Geo, W. et al. "Joint Machine Learning and Game Theory for Rate Control in High Efficiency Video Coding," IEEE Transactions on Image Processing, vol. 26, No. 12, pp. 6074-6089, Dec. 2017, 16 pages.
(Continued)

*Primary Examiner* — William C Vaughn, Jr.
*Assistant Examiner* — Jae N Noh
(74) *Attorney, Agent, or Firm* — Norton Rose Fulbright US LLP

(57) ABSTRACT

Systems and methods which provide a joint machine learning and game theory modeling (MLGT) framework for video coding rate control (RC) are described. A machine learning based R-D model classification scheme may be provided to facilitate improved R-D model prediction accuracy and a mixed R-D model based game theory approach may be implemented to facilitate improved RC performance. For example, embodiments may provide inter frame Coding Tree Units (CTUs) level bit allocation and RC optimization in HEVC. Embodiments provide for the CTUs being classified into a plurality of categories, such as by using a support vector machine (SVM) based multi-classification scheme. An iterative solution search method may be implemented for the mixed R-D models based bit allocation method. Embodiments may additionally or alternatively refine the intra frame QP determination and the adaptive bit ratios among frames to facilitate improving the coding quality smoothness.

36 Claims, 6 Drawing Sheets

(51) Int. Cl.
*H04N 19/172* (2014.01)
*H04N 19/159* (2014.01)
*H04N 19/176* (2014.01)

(58) Field of Classification Search
USPC .................................................. 375/240.12
See application file for complete search history.

(56) References Cited

U.S. PATENT DOCUMENTS

| | | | |
|---|---|---|---|
| 8,401,076 | B2 | 3/2013 | Coulombe |
| 8,750,371 | B2 | 6/2014 | Yang |
| 8,908,758 | B2 | 12/2014 | Leontaris et al. |
| 8,982,947 | B2 | 3/2015 | Au et al. |
| 2005/0036544 | A1 | 2/2005 | Webb et al. |
| 2006/0056508 | A1 | 3/2006 | Lafon et al. |
| 2007/0177665 | A1 | 8/2007 | Zhou et al. |
| 2010/0088264 | A1* | 4/2010 | Teverovskiy .......... G16H 50/20 706/46 |
| 2011/0310962 | A1* | 12/2011 | Ou ....................... H04N 19/159 375/240.03 |
| 2012/0275511 | A1* | 11/2012 | Shemer ................ H04N 19/139 375/240.02 |
| 2013/0128963 | A1 | 5/2013 | Leontaris et al. |
| 2014/0301460 | A1 | 10/2014 | Karczewicz et al. |
| 2014/0355671 | A1 | 12/2014 | Peng et al. |
| 2014/0369405 | A1 | 12/2014 | Chang et al. |

FOREIGN PATENT DOCUMENTS

| | | |
|---|---|---|
| EP | 2339851 A2 | 6/2011 |
| EP | 2643969 A1 | 10/2013 |

OTHER PUBLICATIONS

Sullivan, G. J. et al. "Overview of the High Efficiency Video Coding (HEVC) Standard," IEEE Trans, Circuits Syst. Video Technol., vol. 22, No. 12. pp. 1649-1668. Dec. 2012, 20 pages.

Bross, B. et al. "High Efficiency Video Coding (HEVC) Text Specification Draft 10," JCTVC-L1003, 12th JCTVC Meeting Geneva, CH, Jan. 2013, 333 pages.

Wiegand, T. et al. "Overview of the H.264/AVC Video Coding Standard," IEEE Trans. Circuits Syst. Video Technol., vol. 13, No. 7, pp. 560-576, Jul. 2003, 17 pages.

Ohm, J.-R. et al. "Comparison of the Coding Efficiency of Video Coding Standards—Including High Efficiency Video Coding (HEVC)," IEEE Trans. Circuits Syst. Video Technol., vol. 22, No. 12, pp. 1669-1684, Dec. 2012, 16 pages.

Wang, S. et al. "Rate-GOP Based Rate Control for High Efficiency Video Coding," IEEE J. Sel. Topics Signal Process., vol. 7, No. 6, pp. 1101-1111, Dec. 2013, 11 pages.

Gao, W. et al. "DCT Coefficient Distribution Modeling and Quality Dependency Analysis Based Frame-level Bit Allocation for HEVC," IEEE Trans. Circuits Syst. Video Technol., vol. 26, No. 1, pp. 139-153, Jan. 2016, 15 pages.

Gao, W. et al. "SSIM-based Game Theory Approach for Rate-distortion Optimized Intra Frame CTU-level Bit Allocation," IEEE Trans. Multimedia. vol. 18, No. 6, pp. 988-999, Jun. 2016, 12 pages.

Wang, M. et al. "Low-delay Rate Control for Consistent Quality Using Distortion-based Lagrange Multiplier," IEEE Trans. Image Process., vol. 25, No. 7, pp. 2943-2955, Jan. 4955, Jul. 2016, 13 pages.

Xu, L. et al. "Window-level Rate Control for Smooth Picture Quality and Smooth Buffer Occupancy," IEEE Trans. Image Process., vol. 20, No. 3, pp. 723-734, Mar. 2011, 4 pages.

Seo, C.-W. et al. "Rate Control for Consistent Objective Quality in High Efficiency Video Coding," IEEE Trans. Image Process., vol. 22, No. 6, pp. 2442-2454, Jun. 2013, 13 pages.

Choi, H. et al. "Pixel-wise Unified Rate-quantization Model for Multi-level Rate Control," IEEE J. Sel. Topics Signal Process., vol. 7, No. 6, pp. 1112-1123, Dec. 2013, 12 pages.

Choi, H. et al. "Rate Control Based on Unified RQ Model for HEVC," JCTVC-H0213, 8-th JCTVC meeting, San Jose, CA, Feb. 2012, 13 pages.

Li, B. et al. "λ Domain Rate Control Algorithm for High Efficiency Video Coding," IEEE Trans. Image Process., vol. 23, No. 9, pp. 3841-3854, Sep. 2014, 14 pages.

Li, B. et al. "Rate Control by R-Lambda Model for HEVC," document JCTVC-K0103, 11th Meeting, Shanghai, China, Oct. 2012, 11 pages.

Li, B. et al. "Adaptive Bit Allocation for R-Lambda Model Rate Control in HM", document JCTVC-M0036, 13th JCTVC Meeting, Incheon, South Korea, Apr. 2013, 7 pages.

Li, B. et al. "QP Determination by Lambda Value", document JCTVC-I0426, 9-th JCTVC meeting, Geneva, Switzerland, May 2012, 10 pages.

(Aug. 2016). HM Reference Software 16.8. [Online]. Available: https://hevc.hhi.fraunhofer.de/svn/svn_HEVCSoftware/tags/HM-16.8, 30 pages.

Guo, Y. et al. "Rate Control for Screen Content Coding in HEVC," in Proc. IEEE Int. Symp. Circuits Syst. (ISCAS), Lisbon, Portugal, May 2015, pp. 1118-1121, 4 pages.

Duanmu, F. et al. "Fast Mode and Partition Decision Using Machine Learning for Intra-frame Coding in HEVC Screen Content Coding Extension," IEEE J. Emerg. Sel. Topics Circuits Syst., vol. 6, No. 4, pp. 517-531, Dec. 2016, 15 pages.

Sanz-Rodriguez, S. et al. "RBF-based QP Estimation Model for VBR Control in H.264/SVC," IEEE Trans. Circuits Syst. Video Technol., vol. 21, No. 9, pp. 1263-1277, Sep. 2011, 15 pages.

Luo, J. et al. "Controlling the Bit Rate of Multi-object Videos with Noncooperative Game Theory," IEEE Trans. Multimedia, vol. 12, No. 2, pp. 97-107, Feb. 2010, 11 pages.

Ahmad, I. et al. "On Using Game Theory to Optimize the Rate Control in Video Coding," IEEE Trans. Circuits Syst. Video Technol., vol. 16, No. 2, pp. 209-219, Feb. 2006, 11 pages.

Nash Jr., J. F. "The Bargaining Problem," Econometrica, vol. 18, No. 2, pp. 155-162, Apr. 1950, 9 pages.

Yuan, H. et al. "Rate Distortion Optimized Inter-view Frame Level Bit Allocation Method for MV-HEVC," IEEE Trans. Multimedia, vol. 17, No. 12, pp. 2134-2146, Dec. 2015, 13 pages.

Chang, C.-C. et al. "LIBSVM: A Library for Support Vector Machines," ACM Trans. Intell. Syst. Technol., vol. 2, No. 3, Apr. 2011, Art. No. 27, accessed on Aug. 2016. [Online]. Available: http://www.csie.ntu.edu.tw/~cjlin/libsvm, 39 pages.

Schölkopf, B. et al. "New Support Vector Algorithms," Neural Comput., vol. 12, No. 5, pp. 1207-1245, May 2000, 39 pages.

Hsu, C.-W. et al. "A Comparison of Methods for Multiclass Support Vector Machines," IEEE Trans. Neural Netw., vol. 13, No. 2, pp. 415-425, Mar. 2002, 11 pages.

(Aug. 2016). Convex Function. [Online]. Available: http://en.wikipedia.org/wiki/Convex_function, 6 pages.

(Aug. 2016). Karush-Kuhn-Tucker Conditions. [Online]. Available: http://en.wikipedia.org/wiki/Karush-Kuhn-Tucker_conditions, 7 pages.

(Aug. 2016). Cubic Function. [Online]. Available: https://en.wikipedia.org/wiki/Cubic_function, 14 pages.

Li, L. et al. "λ-Domain Optimal Bit Allocation Algorithm for High Efficiency Video Coding," IEEE Trans. Circuits Syst. Video Technol., vol. 28, No. 1, Jan. 2018, 13 pages.

Bjontegaard, G. "Calculation of Average PSNR Differences Between RD-Curves," document VCEG-M33, Austin, TX, USA, Apr. 2001, 4 pages.

(Feb. 2017). Non-Cooperative Game Theory. [Online]. Available: https://en.wikipedia.org/wiki/Non-cooperative_game_theory, 2 pages.

(Feb. 2017). Cooperative Game Theory. [Online]. Available: https://en.wikipedia.org/wiki/Cooperative_game_theory, 11 pages.

(Feb. 2017). Nash Equilibrium. [Online]. Available: https://en.wikipedia.org/wiki/Nash_equilibrium, 16 pages.

Lee, J. et al. "Adaptive Intra-frame Assignment and Bit-rate Estimation for Variable GOP Length in H.264," IEEE Trans. Circuits Syst. Video Technol., vol. 16, No. 10, pp. 1271-1279, Oct. 2006, 9 pages.

(56) References Cited

OTHER PUBLICATIONS

Ding, J.-R. et al. "Adaptive Group-of-pictures and Scene Change Detection Methods Based on Existing H.264 Advanced Video Coding Information," IET Image Process., vol. 2, No. 2, pp. 85-94, Apr. 2008, 10 pages.
Zupancic, I. et al. "Two-pass Rate Control for Improved Quality of Experience in UHDTV Delivery," IEEE J. Sel. Topics Signal Process., vol. 11, No. 1, pp. 167-179, Feb. 2017, 13 pages.
Wang, S. et al. "SSIM-inspired Two-pass Rate Control for High Efficiency Video Coding," Proc. IEEE Int. Workshop Multimedia Signal Process., Xiamen, China, pp. 1-5, Oct. 2015, 5 pages.
Gao, W. et al. "Phase Congruency Based Edge Saliency Detection and Rate Control for Perceptual Image and Video Coding," Proc. IEEE Int. Conf. Syst., Man, Cybern., Budapest, Hungary, Oct. 2016, pp. 264-269, 6 pages.
Gao, W. et al. "Multiscale Phase Congruency Analysis for Image Edge Visual Saliency Detection," Proc. Int. Conf. Mach. Learn. Cybern., Jeju, South Korea, Jul. 2016, pp. 75-80, 6 pages.
Zhang, Y. et al. "Machine Learning-based Coding Unit Depth Decisions for Flexible Complexity Allocation in High Efficiency Video Coding," IEEE Trans. on Image Process., vol. 24, No. 7, pp. 2225-2238, Jul. 2015, 14 pages.
Wang, X. et al. "Applying Game Theory to Rate Control Optimization for Hierarchical B-pictures," IEEE Trans. Broadcast., vol. 59, No. 4, pp. 591-601, Dec. 2013, 11 pages.
Wang, X. et al. "Generalized Nash Bargaining Solution to Rate Control Optimizaion for Spatial Scalable Video Coding," IEEE Trans. Image Process., vol. 23, No. 9, pp. 4010-4021, Sep. 2014, 12 pages.

* cited by examiner

SYSTEMS AND METHODS FOR RATE CONTROL IN VIDEO CODING USING JOINT MACHINE LEARNING AND GAME THEORY

TECHNICAL FIELD

The invention relates generally to video coding and, more particularly, to joint machine learning and game theory based rate control in video coding.

BACKGROUND OF THE INVENTION

Video coding is a fundamental and key task in video streaming and communication systems. For example, video coding provides an important role in relieving the burden with respect to storage and transmission in various practical multimedia processing and communication systems.

High Efficiency Video Coding (HEVC) has become the most popular video coding standard after its final standardization release in 2013 by the Joint Collaborative Team on Video Coding (JCTVC) of the ITU-T Video Coding Experts Group (VCEG) and the ISO Moving Picture Experts Group (MPEG). HEVC doubles the coding efficiency as compared to its predecessor H.264/AVC standard by adopting new and complex coding tools.

Rate control (RC) is an important technique to improve the video coding performance with respect to storage and transmission. RC is widely used in video coding and transmission systems, such as systems which encode the Group of Pictures (GOPs), frames, and Coding Tree Units (CTUs) under a bit rate constraint with the goal of achieving better RC performances by setting Quantization parameters (QPs) properly. Accordingly, bit allocation at different coding levels (e.g., group of pictures (GOP), frame, and coding tree unit (CTU)) is a key step of rate control to improve the coding performance. Current bit allocation schemes are typically based on Rate-Distortion (R-D) models because of the higher optimization performance. In general, the objectives of RC optimization typically include improving R-D performance, achieving accurate bit rate achievements, maintaining coding quality smoothness, and stable buffer control to avoid the occurrences of overflow and underflow cases. Therefore, the modeling accuracy of R-D relationships for CTUs is important in many video coding schemes, and is often a prerequisite for the overall coding efficiency gains.

Prior efforts to optimize the RC performance have included efforts to optimize RC performance for different coding structures (e.g., all intra (AI), low delay B and P (LB/LP), and random access (RA)), for different optimization objectives (e.g., R-D performance, quality smoothness, and buffer control), and at different coding levels (e.g., GOP level, frame level, and block level). There have essentially been three categories for prior RC optimization methods. One such category of RC optimization methods includes the Q-domain based RC methods which achieve better R-D performances by exploring the relationships between Quantization step ($Q_{step}$), the coding distortion D, and the consumed bits R. The typical work for HEVC is the pixel-wise Unified Rate Quantization (URQ) model. Another category of RC optimization methods includes the λ-domain RC based methods which jointly consider the Lagrange multiplier decisions for both Rate-Distortion-Optimization (RDO) and RC. The typical work for HEVC is the R-λ model based RC with QP-λ relationship, which has been adopted by JCTVC and implemented in the latest HM16.8. The final such category of RC optimization methods includes the ρ-domain based RC methods which reveal the relationships between the percentage of zero quantized Discrete Cosine Transform (DCT) coefficients and R, D, Qstep, respectively, for the further RC optimization.

In the current existing video transmission and communication market, other than some video coding products which adopt the H.264 coding standard, the HEVC based video encoding and decoding systems adopt the R-λ model based RC method. However, the R-λ model based RC methods do not handle CTU level bit allocation optimization well because of the drastic motions and scene changes for CTUs among adjacent frames. For example, the aforementioned RC methods adopt spatial-temporal prediction and regression methods for the prediction and updating of R-D model parameters. However, such spatial-temporal prediction and regression methods are not always accurate with respect to the prediction and updating of R-D model parameters, especially for CTUs.

BRIEF SUMMARY OF THE INVENTION

The present invention is directed to systems and methods which provide a joint machine learning and game theory modeling (MLGT) framework for video coding rate control (RC). In accordance with embodiments herein, a machine learning based R-D model classification scheme is provided to facilitate improved R-D model prediction accuracy. Additionally or alternatively, a mixed R-D model based game theory approach is implemented for bit allocation optimization according to embodiments to facilitate improved RC performance. Moreover, an iterative solution search method is implemented according to embodiments for the mixed R-D models based bit allocation method. Embodiments may additionally or alternatively refine the intra frame QP determination and the adaptive bit ratios among frames to facilitate improving the coding quality smoothness.

A MLGT RC technique implemented according to embodiments of the invention may, for example, be utilized to provide inter frame Coding Tree Units (CTUs) level bit allocation and RC optimization in HEVC, wherein the size of CTU may, for example, be set as the typical 64×64 or other sizes (e.g. 32×32, 128×128, etc). A machine learning based R-D model classification scheme is provided for inter frame CTUs, wherein operation according to some embodiments provides for the CTUs with a lot of skip modes being specially handled, while the other CTUs are classified into a plurality of categories. A support vector machine (SVM) based multi-classification scheme is utilized with respect to the R-D model classification scheme of embodiments. A mixed R-D model based cooperative bargaining game theory modeling method, wherein the minimum utility definition is adjusted by the reference previous collocated CTU coding distortion and frame level Quantization parameter (QP) change, may be implemented for bit allocation optimization. For example, a mixed R-D model based utility function convexity may be provided (e.g., the convexity of the feasible utility set based on the mixed R-D models), wherein its Nash bargaining solution (NBS) may be achieved by an iterative solution search method. The minimum utility may be adjusted by the reference previous collocated CTU coding distortion and the frame level QP change. In operation according to embodiments of the invention, the intra frame QP and the inter frame adaptive bit ratios may be adjusted to make inter frames have more bit resources in the bargaining game optimization to maintain smooth quality and bit consumption.

In accordance with embodiments of the invention, a method for video coding Rate Control (RC) is provided. The method of embodiments utilizes machine learning to provide selection of different Rate-Distortion (R-D) models from a plurality of R-D models for video coding for different portions of a video stream and game theory modeling in RC bit allocation using the selected R-D models for the different portions of the video stream in video coding.

In accordance with further embodiments of the invention, a system for video coding Rate Control (RC) is provided. The system may include at least one processor and a memory coupled to the at least one processor. The at least one processor of embodiments of the invention is configured to implement machine learning based upon Rate-Distortion (R-D) model classification to provide selection of different R-D models from a plurality of R-D models for video coding of different portions of a video stream. The at least one processor of embodiments is also configured to implement mixed R-D model based cooperative bargaining game theory modeling in RC bit allocation using the selected R-D models for the different portions of the video stream in video coding.

In accordance with still further embodiments of the invention, a method for video coding Rate Control (RC) for High Efficiency Video Coding (HEVC) is provided. The method of embodiments utilizes machine learning to provide selection of different Rate-Distortion (R-D) models from a plurality of inter frame Coding Tree Unit (CTU) level R-D models for video coding of frames of a video stream, wherein the machine learning is based upon R-D model classification. The method of embodiments also utilizes mixed R-D model based cooperative bargaining game theory modeling in RC bit allocation using the R-D models selected for the different portions of the video stream in video coding.

MLGT RC techniques implemented according to the concepts of the present invention achieve improved R-D performance, quality smoothness, bit rate accuracy, and/or buffer control results than existing one-pass RC methods. In particular, the R-D performance achieved by MLGT RC implementations of embodiments are very close to the performance limits of the fixed QP method.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
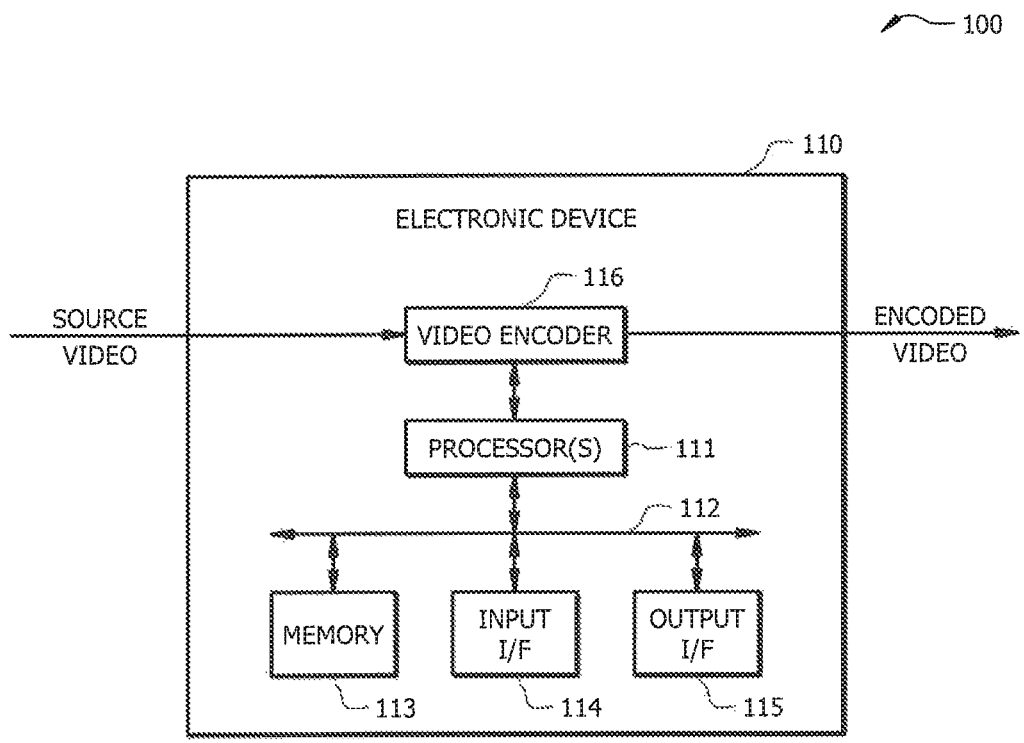
FIG. 1 shows a system adapted to provide machine learning and game theory modeling (MLGT) based video coding rate control (RC) according to embodiments of the invention.

FIG. 1 shows an exemplary system adapted to provide High Efficiency Video Coding (HEVC) in accordance with the concepts herein. In particular, system 100 of the illustrated embodiment comprises electronic device 110 adapted to provide video encoding implementing a joint machine learning and game theory modeling (MLGT) framework for video coding rate control (RC) according to embodiments of the invention.

Electronic device 110 may comprise various configurations of devices. For example, electronic device 110 of embodiments may comprise a computer, a laptop computer, a tablet device, a server, a dedicated spatial processing component or device, a smartphone, a personal digital assistant (PDA), an Internet of Things (IOT) device, a network equipment (e.g. router, access point, femtocell, picocell, etc.), a set-top-box, a cable headend system, a smart television (TV), and/or the like. Irrespective of the particular implementation, electronic device 110 of embodiments provides video coding using MLGT RC with respect to source video to provide HEVC encoded video. The source video may comprise video captured by one or more image capture devices of or connected to electronic device 110, video provided to electronic device 110 from another source (e.g., file server, remote image capture device, cable headend system, etc.), such as via one or more network connections (e.g., local area network (LAN), metropolitan area network (MAN), wide area network (WAN), the Internet, a wireless LAN (WLAN), a cellular network, a cable transmission system, the public switched telephone network (PSTN), etc.), and/or stored by the electronic device (e.g., in a video database of a memory thereof). The encoded video may be provided to one or more other components, electronic devices and/or other systems (e.g., a memory, a video decoder, a radio transmitter, a network interface card, a computer, a laptop computer, a tablet device, a server, a dedicated spatial processing component or device, a smartphone, a PDA, an IOT device, a network equipment, a set-top-box, a cable headend system, a smart TV such as via one or more direct and/or network connections (e.g., LAN, MAN, WAN, WLAN, a cellular network, a cable transmission system, the PSTN, etc.), for storage, playback, broadcast, distribution, etc.

Electronic device 110 may comprise any number of components operable to facilitate functionality the electronic device in accordance with the concepts herein, such as processor(s) 111, system bus 112, memory 113, input interface 114, output interface 115, and video encoder 116 of the illustrated embodiment. Processor(s) 111 may comprise one or more processing units, such as a central processing unit (CPU) (e.g., a processor from the Intel CORE family of multi-processor units), a field programmable gate array (FPGA), and/or an application specific integrated circuit (ASIC), operable under control of one or more instruction sets defining logic modules configured to provide operation as described herein. System bus 112 couples various system components, such as memory 113, input interface 114, output interface 115 and/or video encoder 116 to processor(s) 111. Accordingly, system bus 112 of embodiments may be any of various types of bus structures, such as a memory bus or memory controller, a peripheral bus, and/or a local bus using any of a variety of bus architectures. Additionally or alternatively, other interface and bus structures, such as a parallel port, game port or a universal serial bus (USB) may be utilized. Memory 113 may comprise various configurations of volatile and/or non-volatile computer-readable storage media, such as RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Input interface 114 facilitates coupling one or more input components or devices to processor(s) 111. For example, a user may enter commands and information into electronic device 110 through one or more input devices (e.g., a keypad, microphone, digital pointing device, touch screen, etc.) coupled to input interface 114. Image capture devices, such as a camera, scanner, 3-D imaging device, etc., may be coupled to input interface 114 of embodiments, such as to provide source video herein. Output interface 115 facilitates coupling one or more output components or devices to processor(s) 111. For example, a user may be provided output of data, images, video, sound, etc. from electronic device 110 through one or more output devices (e.g., a display monitor, a touch screen, a printer, a speaker, etc.) coupled to output interface 115. Output interface 115 of embodiments may provide an interface to other electronic components, devices and/or systems (e.g., a memory, a video decoder, a radio transmitter, a network interface card, devices such as a computer, a laptop computer, a tablet device, a server, a dedicated spatial processing component or device, a smartphone, a PDA, an IOT device, a network equipment, a set-top-box, a cable headend system, a smart TV, etc.).

In operation, video encoder 116 provides HEVC with respect to source video using a MLGT RC technique to provide encoded video having improved rate control performances on bit rate accuracy, R-D performance, quality smoothness, and buffer control results. Embodiments of video encoder 116 operable to provide video coding using MLGT RC according to the concepts herein may, for example, be used in various video communication systems and real-time video streaming applications, such as cable TV programs, video-on-demand (VOD), live TV, videos over the Internet, and real-time video chat on computers or portable devices.

In understanding video coding using MLGT RC techniques according to the concepts herein, it is helpful to understand that that the R-$\lambda$ model commonly utilized for RC cannot effectively handle the cases with drastic motions or abrupt scene changes. Similarly, for camera captured videos, the drastic motions or abrupt scene changes also exist in the CTU level coding. Therefore, the R-$\lambda$ model is not fully competent to deal with the CTU level bit allocation and rate control optimization because the scene change is assumed to be smooth in the R-$\lambda$ model parameter updating method. However, the achievement of accurate R-D models is a prerequisite to achieving R-D performance improvements. Additionally, bit allocation of a RC implementation benefits from an effective modeling to achieve the RC optimization goals comprehensively. Therefore, embodiments of video encoder 116 are adapted to provide an accurate CTU level R-D model prediction method and an effective bit allocation optimization model for providing RC optimization.

It should be appreciated that bit allocation in RC greatly influences R-D performance and smoothness quality. Because of drastic motions and abrupt scene changes often present in video streams, CTU level coding complexity changes may be very large even for adjacent frames, and therefore the prediction and updating of CTU level R-D model parameters from the traditional spatial-temporal prediction and regression methods are often not accurate. Accordingly, embodiments of MLGT RC techniques according to the concepts herein utilize a machine learning based R-D model prediction method to achieve accurate R-D models for CTU level bit allocation and RC optimization well suited for use with respect to CTUs with drastic motions and abrupt scene changes.

Machine learning is an effective way to achieve an accurate model from extracted features. Although, there are some works in video coding using machine learning to solve the fast mode decision problems to achieve coding complexity reductions, few works in video coding have been focused on using machine learning for rate control optimization. In S. Sanz-Rodriguez and F. Diaz-de-Maria, "RBF-Based QP estimation model for VBR control in H.264/SVC, "*IEEE Trans. Circuits Syst. Video Technol.*, vol. 21, no, 9, pp. 1263-1277, September 2011 (the disclosure of which is incorporated herein by reference), for example, frame level QP increments are predicted by a radial basis function (RBF) network for the quality smoothness of H.264/SVC under the variable bit rate (VBR) environment. The extracted RC related features include the current buffer fullness, consumed bits, buffer size, and target buffer fullness. However, the RBF-based QP estimation is proposed for quality smoothness and VBR environment, not for R-D performance improvements and a constant bit rate (CBR) environment. In contrast to the foregoing, R-D performance optimization and quality smoothness are jointly considered for CTU level RC optimization under a CBR environment in accordance with MLGT RC techniques implemented according to embodiments of the invention. For example, embodiments analyze the R-D relationships for inter frame CTUs, including the model parameter ranges, and utilize a support vector machine (SVM) based multi-classification scheme to improve the R-D modeling accuracy. Accordingly, in a machine learning based R-D model prediction method implemented according to embodiments, a SVM based multi-classification scheme is implemented to predict the R-D models for inter frame CTUs. It should be appreciated, however, that other classification/multi-classification purpose machine learning algorithms may be utilized in addition to or in the alternative to a SVM learning multi-classification algorithm according to embodiments herein. In operation according to embodiments, the features are extracted from the original video data and the coding results from the previous frames. An advantage of using such machine learning techniques according to embodiments herein is that the traditional spatial-temporal prediction and regression methods may be avoided to make the predicted R-D model be more accurate, particularly with respect to CTUs with drastic motions and abrupt scene changes.

Bit allocation in RC optimization is a resource allocation problem and game theory can be an effective approach for resource allocation problems. Accordingly, embodiments implement a mixed R-D model based cooperative game theory modeling method to optimize the bit allocation performance.

Game theory has two different categories, including non-cooperative games and cooperative games. Cooperative games are very suitable for the modeling of bit allocation, in which every coding frame or unit can be deemed as a player, and Nash bargaining solution (NBS) (see J. Nash, "The bargaining problem," *Econometrica*, vol. 18, no. 2, pp. 155-162, April 1950, the disclosure of which is incorporated herein by reference) can be achieved. Different CTUs from a frame or different frames from a GOP can be modeled as players to compete for bit resources to improve their own coding quality.

Some works have been done with respect to using game theory for bit allocation optimization. For example, in J. Luo, I. Ahmad, and Y. Sun, "Controlling the bit rate of multi-object videos with noncooperative game theory," *IEEE Trans. Multimedia*, vol. 12, no. 2, pp. 97-107, February 2010 (the disclosure of which is incorporated herein by reference), Nash equilibrium, can be achieved in the non-cooperative game for the bit allocation modeling among multiple objects in a frame. In W. Gao, S. Kwong, Y. Zhou and H. Yuan, "SSIM-based game theory approach for rate-distortion optimized intra frame CTU-level Bit allocation," *IEEE Trans. Multimedia*, vol. 18, no. 6, pp. 988-999, June 2016, X. Wang, S. Kwong, and Y. Zhang, "Applying game theory to rate control optimization for hierarchical B-pictures," *IEEE Trans. Broadcast.*, vol. 59, no. 4, pp. 591-601, December 2013, and X Wang, S. Kwong, L. Xu, and Y. Zhang, "Generalized Nash bargaining solution to rate control optimization for spatial scalable video coding," *IEEE Trans. Image Process.*, vol. 23, no. 9, pp, 4010-4021, September 2014 (the disclosures of each of which are incorporated herein by reference), the cooperative games are modeled for the bit allocation optimization among different intra frame CTUs in HEVC, hierarchical B frames in H.264 and its scalable extension, respectively. However, in the existing cooperative game modelings, only single R-D model based bit allocation optimization problem is discussed and mixed R-D model cases are not mentioned. Moreover, the minimum utility is defined only from the coding distortion or consumed bits of the previous collocated frames or CTUs, which is not sufficient to take into account different optimization goals, such as better R-D performances and quality smoothness.

In a mixed R-D model based cooperative game theory modeling method to optimize the bit allocation performance according to embodiments of the invention, the adoption of mixed R-D models provides convexity of the mapping function in the feasible utility set for the bargaining game. In operation according to embodiments, an iterative solution search method is also implemented to achieve the bargaining results for the non-numerical solution problem. The minimum utility definition is also refined by the joint consideration on the reference coding distortion and the frame level QP according to embodiments, which helps maintain the coding quality smoothness and make the CTU level bit allocation competition more reasonable.

Moreover, MLGT RC implementations using mixed R-D model based cooperative game theory modeling according to embodiments of the invention operate to refine the intra frame QP determination and the adaptive bit ratios among frames. In operation according to embodiments, compared with the R-$\lambda$ model based RC method adopted by JCTVC and implemented in the latest HEVC reference software, more bits may be allocated to inter frames to best exploit the potential of the MLGT RC method to improve the R-D performances. Much closer frame level adaptive bit ratios, as provided according to embodiments, may also improve the coding quality smoothness.

It can be appreciated from the foregoing that MLGT RC techniques of embodiments of the invention implement a multiple step method operable to improve or optimize the bit allocation performance. For example, in one step (e.g., a first step) of an embodiment of a MLGT RC technique implemented in accordance with the concepts herein accurate inter frame CTU level R-D models are achieved by machine learning. In another step (e.g., a second step) of an embodiment of a MLGT RC technique implemented in accordance with the concepts herein RC optimization goals are achieved in a game theory modeling and optimization framework. Further details with respect to machine learning based R-D model prediction for inter frame CTUs and cooperative game theory modeling for inter frame CTUs as may be utilized by embodiments of the above mentioned multiple step MLGT RC technique are provided below.

Machine Learning Based R-D Model Prediction for Inter Frame CTUs

As previously mentioned, in a step of an embodiment of a MLGT RC technique implemented by embodiments of the invention, accurate inter frame CTU level R-D models are achieved by machine learning. In contrast, the existing CTU level rate control scheme proposed by JCTVC-M0036 (see B. Li, H. Li, L. Li, "Adaptive bit allocation for R-lambda model rate control in HM," JCTVC-M0036, 13th JCTVC meeting, Incheon, KR, April 2013, the disclosure of which is incorporated herein by reference) and implemented in HM16.8 (see HM Reference Software 16.8, (2016, August), the disclosure of which is incorporated herein by reference), the allocated bits for CTUs are based on the bit weights which are calculated from the picture level $\lambda$ and the R-$\lambda$ model parameters. In this existing CTU level rate control scheme the parameters will be updated by the actual consumed bits R and actual $\lambda$ values of the collocated CTUs in the previous frame. A problem with the foregoing existing CTU level rate control scheme is that the block level coding complexity will be easily changed, even for adjacent frames. The drastic motions and abrupt scene changes in CTUs will greatly reduce the robustness and accuracy of the R-$\lambda$ model, which will degrade the RC performance. Accordingly, this traditional spatial-temporal prediction method does not work well for CTUs in R-D modeling. In addition, the collocated CTUs in the adjacent several frames may adopt the same or close QPs, which also causes the real-time regression based methods to fail to achieve accurate R-D model parameters.

Embodiments of the invention utilize R-D modeling analysis for inter frame CTUs to better take into account the coding complexity changes of CTUs. For example, embodiments may operate to predict the R-D models based on the previous and current textural changes from original video signals to eliminate the parameter updating method based on the previous coding results by the traditional spatial-temporal prediction and regression method. As a specific example, an embodiment of the invention operate to extract effective features from the previous three frames, and then use machine learning technique to identify which kind of R-D model the current CTU belongs to. The accuracy improvement in R-D modeling for CTUs provided according to embodiments enhances the R-D performance from bit allocation optimization.

In operation according to embodiments of the present invention, the R-D relationships for different CTUs are analyzed and accurate modeling is achieved by machine learning. A special case of the R-D relationship for different CTUs may be presented with respect to the presence of SKIP modes in inter frames. Often, there are an appreciable number of SKIP modes in inter frames (see W. Gao, S. Kwong, H. Yuan and X Wang, "DCT coefficient distribution modeling and quality dependency analysis based frame-level bit allocation for HEVC," *IEEE Trans. Circuits Syst. Video Technol.*, vol. 26, no. 1, pp. 139-153, January 2016, the disclosure of which is incorporated herein by reference) that avoid the coding process and directly copy the coded CUs as the prediction for the current CU. The bit consumption of SKIP mode is only from the flag information, and the distortion is highly related to the reference pixels. Accordingly, it can be appreciated that the skipped CUs have a different R-D relationship from the other non-skipped CUs. Therefore, the CTUs with a relatively large number of skip modes (e.g., CTUs meeting a predetermined threshold number of skip modes, referred to herein as "SKIP_Most_CTUs" or "SMC") may be specially handled according to embodiments.

The determination of SKIP_Most_CTUs according to embodiments may, for example, be based on the bits per pixel (bpp) in the previous collocated CTU and a skip mode percentage threshold (e.g., using a threshold bpp value to indicate the skip mode percentage threshold instead, such as 0.005 bpp, as may be established empirically, which can also be other similar values). If the consumed bits of the previous collocated CTU is below this threshold, the current CTU is determined as SKIP_Most_CTUs in accordance with some embodiments of the inventor. In operation according to embodiments, for the CTUs determined to belong to the SKIP_Most_CTUs classification, because the consumed bits are very negligible, no R-D models will be used, and the consumed bits is predicted by the previous collocated CTU. For the R-D relationship of CTUs categorized as SKIP_Most_CTUs, although no detailed expressions for the R-D model is provided, the consumed bits R is very low and closer to zero, and the distortion D is almost the same with the distortions from the referenced blocks.

From the Cauchy distribution model for DCT transformed coefficients (see H. Yuan, S. Kwong, X. Wang, W. Gao and Y. Zhang, "Rate distortion optimized inter-view frame level bit allocation method for MV-HEVC," *IEEE Trans. Multimedia*, vol. 17, no. 12, pp. 2134-2146, December 2015, the disclosure of which is incorporated herein by reference), the R-D model exhibits the following power function based relationship:

$$R = m_i D_i^{-n_i}, \qquad (1)$$

where $m_i$ and $n_i$ are model parameters, and $m_i, n_i > 0$. Therefore, the other CTUs can be analyzed by using the power function based R-D model. To test the CTU level R-D relationships in HEVC encoded B inter frames, an experiment has been conducted, where five QPs (QP=20, 26, 32, 38, 44) are used for quantization process, respectively.

Table I below shows parameter ranges and fitting accuracy for power function based R-D models for 18 video sequences from Class A, C, D, and E (e.g., the JCTVC recommended 18 video sequences categorized into five classes), wherein for each video sequence five different QPs (QPs 20, 26, 32, 38, and 44) were tested. Embodiments provide a classification approach to discriminate different CTUs, for simplicity. Accordingly, all the CTUs are categorized into a plurality of classes, such as may include various order R-D model classes and possibly one or more specially handled cases classes, according to embodiments. For example, all CTUs except SKIP_Most_CTUs may be divided into two categories, such as may correspond to 1.0-order and 1.5-order R-D models, respectively $$R_i = C_{1,i}/D_i, \qquad (2)$$

$$R_i = C_{2,i}/D_i^{3/2}, \qquad (3)$$

where $R_i$ and $D_i$ are the consumed bits and mean-squared-error (MSE) based coding distortion, respectively, and $C_{1,i}$ and $C_{2,i}$ are the model parameters which can indicate the coding complexity of the prediction residual signals. All other CTUs (i.e., those not divided into the 1.0-order and 1.5-order R-D models) may be divided into the special case category, SKIP_Most_CTUs, according to this example embodiment.

TABLE I

| | PARAMETER RANGERS AND FITTING ACCURACY POWER | | | | | |
|---|---|---|---|---|---|---|
| Class | Sequence | $m_{min}$ | $m_{max}$ | $n_{min}$ | $n_{max}$ | Accuracy |
| A | PeopleOnStreet | 0.1925 | 13.5626 | 0.5234 | 2.1960 | 0.9876 |
|   | Traffic | 0.0697 | 38.5621 | 0.6006 | 1.6329 | 0.9668 |
| B | BasketballDrive | 0.1771 | 136.878 | 0.6163 | 3.7048 | 0.9394 |
|   | BQTerrace | 0.0148 | 49.2892 | 0.1528 | 1.9362 | 0.9473 |
|   | Cactus | 2.8172 | 82.4321 | 0.7385 | 2.7570 | 0.9642 |
|   | Kimono | 0.1410 | 19.0636 | 0.5725 | 2.6896 | 0.9704 |
|   | ParkScene | 0.0437 | 25.1527 | 0.6581 | 2.9199 | 0.9670 |
| C | BasketballDrill | 0.2555 | 15.2360 | 0.6782 | 1.6391 | 0.9836 |
|   | BQMall | 0.3750 | 16.1885 | 0.6219 | 1.9062 | 0.9781 |
|   | PartyScene | 0.5907 | 54.9573 | 0.5215 | 1.5404 | 0.9609 |
|   | RaceHorsesC | 0.0930 | 44.1109 | 0.5939 | 1.6799 | 0.9713 |
| D | BasketballPass | 0.3135 | 18.4179 | 0.5723 | 1.2517 | 0.9808 |
|   | BlowingBubbles | 2.0962 | 29.2897 | 0.7092 | 1.6099 | 0.9759 |
|   | BQSquare | 0.9374 | 20.4423 | 0.5817 | 1.3138 | 0.9614 |
|   | RaceHorses | 0.3160 | 30.8347 | 0.5699 | 1.6758 | 0.9815 |
| E | FourPeople | 0.0542 | 5.2208 | 0.6978 | 1.4086 | 0.9596 |
|   | Johnny | 0.0707 | 2.7832 | 0.5445 | 1.8092 | 0.8829 |
|   | KristenAndSara | 0.0851 | 7.8171 | 0.6151 | 1.7814 | 0.9263 |
|   | Average | 0.4802 | 33.9021 | 0.5871 | 1.9696 | 0.9614 |

In operation according to embodiments of the invention, the CTUs are divided into a relatively small number of categories (e.g., 3 categories). Embodiments may operate not to divide the CTUs into larger classes because the computational complexity of a multi-classification classifier may be high and thus not suitable for real-time video coding. Moreover, the classification accuracy of a multi-classification classifier cannot be guaranteed for many categories. Accordingly, all CTUs of embodiments of the invention may, for example, be classified into three categories (e.g., 1.0-order R-D model, 1.5-order R-D model, and SMC), which is enough for the accurate R-D modelings for CTUs and still has a relatively low complexity for the real-time classification task.

FIGS. 2A-2D illustrate the CTU level R-D relationship modeling for B frames for exemplary 1.0-order and 1.5-order R-D models according to embodiments. In particular, for different CTUs. For example, the 1.0-order RID model can perform much better than the 1.5-order R-D model for some video sequences and CTUs, and vice versa. As shown in Table II, if the 1.0-order and 1.5-order power function based R-D models are separately used for all CTUs, the fitting accuracy results are 94.83% and 91.82%, respectively. These two kinds of power orders both have the possibility to perform better than the other. If the best model is selected for each CTU, the selected percentages of these two models are 20.73% and 7.71% in the frame level average, respectively. In accordance with embodiments, the other 71.56% CTUs may be selected to be the aforementioned special case, SKIP_Most_CTUs, whereby the total curve fitting accuracy can be increased to 97.03%. Embodiments of the invention, therefore, implement a classification scheme to select the best R-D model for each CTU to provide improved fitting accuracy for all CTUs in a frame.

TABLE II

SEPARATE R-D MODELS AND SELECTION PERCENTAGES IN THE CLASSIFICATION SCHEME

| Class | Sequence | Fitting | | Selected Percentages | | | Best Accuracy |
|---|---|---|---|---|---|---|---|
| | | 1.0-order | 1.5-order | 1.0-order | 1.5-order | SMC | |
| A | PeopleOnStreet | 0.9764 | 0.9220 | 0.5208 | 0.1456 | 0.3336 | 0.9846 |
| | Traffic | 0.9712 | 0.9629 | 0.0702 | 0.0590 | 0.8708 | 0.9892 |
| B | BasketballDrive | 0.8624 | 0.9372 | 0.0439 | 0.2231 | 0.7329 | 0.9444 |
| | BQTerrace | 0.9626 | 0.8901 | 0.0537 | 0.0051 | 0.9412 | 0.9649 |
| | Cactus | 0.9199 | 0.9647 | 0.0553 | 0.1459 | 0.7988 | 0.9761 |
| | Kimono | 0.9237 | 0.9447 | 0.1180 | 0.2231 | 0.6588 | 0.9667 |
| | ParkScene | 0.9439 | 0.9283 | 0.0741 | 0.0502 | 0.8757 | 0.9711 |
| C | BasketballDrill | 0.9844 | 0.9347 | 0.2808 | 0.0519 | 0.6673 | 0.9888 |
| | BQMall | 0.9735 | 0.9511 | 0.1712 | 0.0962 | 0.7327 | 0.9878 |
| | PartyScene | 0.9420 | 0.8469 | 0.3827 | 0.0365 | 0.5808 | 0.9441 |
| | RaceHorsesC | 0.9622 | 0.9231 | 0.4519 | 0.1942 | 0.3538 | 0.9766 |
| D | BasketballPass | 0.9510 | 0.8322 | 0.2643 | 0.0000 | 0.7357 | 0.9510 |
| | BlowingBubbles | 0.9727 | 0.8962 | 0.2714 | 0.0357 | 0.6929 | 0.9744 |
| | BQSquare | 0.9456 | 0.8367 | 0.2143 | 0.0071 | 0.7786 | 0.9460 |
| | RaceHorses | 0.9600 | 0.8538 | 0.7214 | 0.0214 | 0.2571 | 0.9605 |
| E | FourPeople | 0.9620 | 0.9768 | 0.0150 | 0.0308 | 0.9542 | 0.9889 |
| | Johnny | 0.9231 | 0.9659 | 0.0075 | 0.0267 | 0.9658 | 0.9760 |
| | KristenAndSara | 0.9334 | 0.9600 | 0.0142 | 0.0358 | 0.9500 | 0.9739 |
| | Average | 0.9483 | 0.9182 | 0.2073 | 0.0771 | 0.7156 | 0.9703 |

Figure 2A:
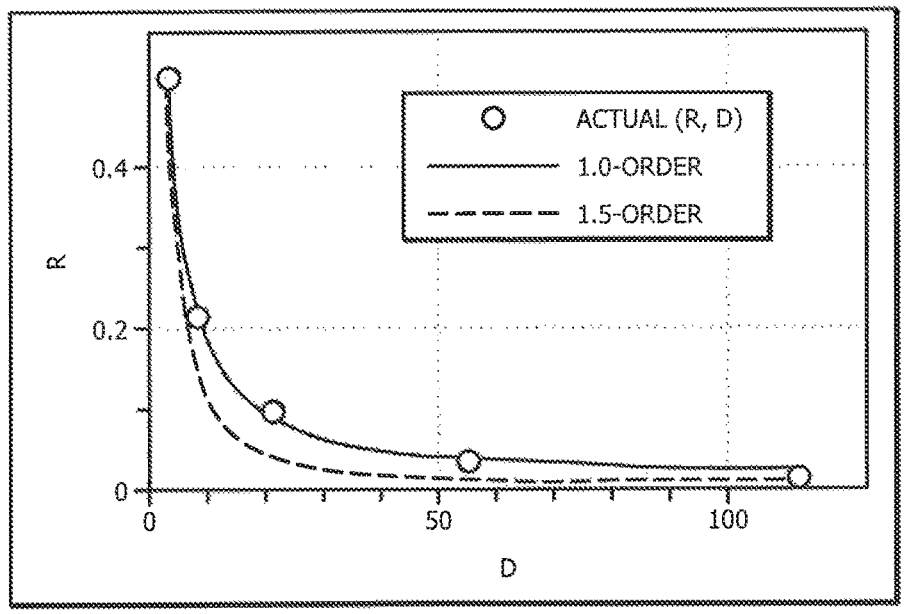
FIG. 2A-2D illustrate R-D relationship modeling for B frames for exemplary power function based R-D model order classes according to embodiments of the invention.
Figure 2B:
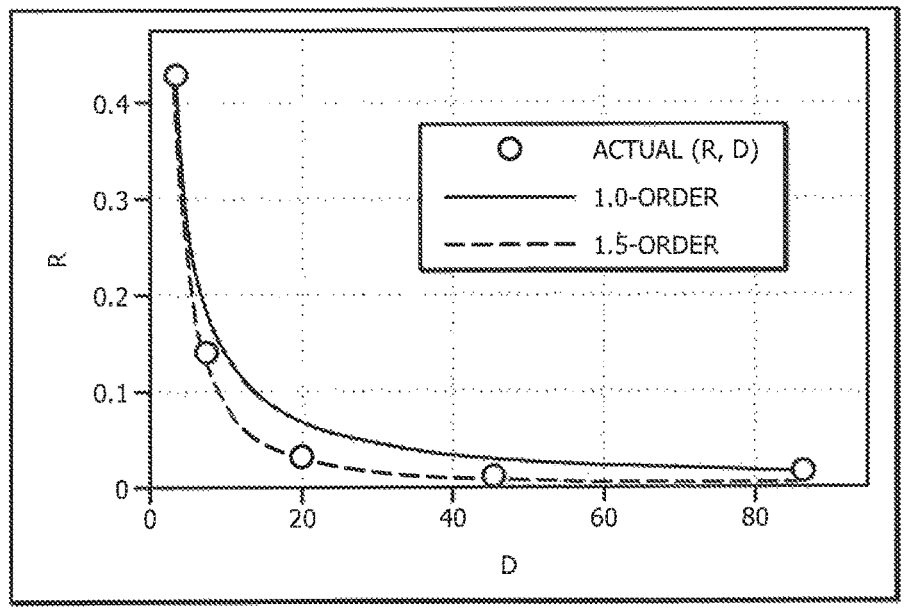
Figure 2C:
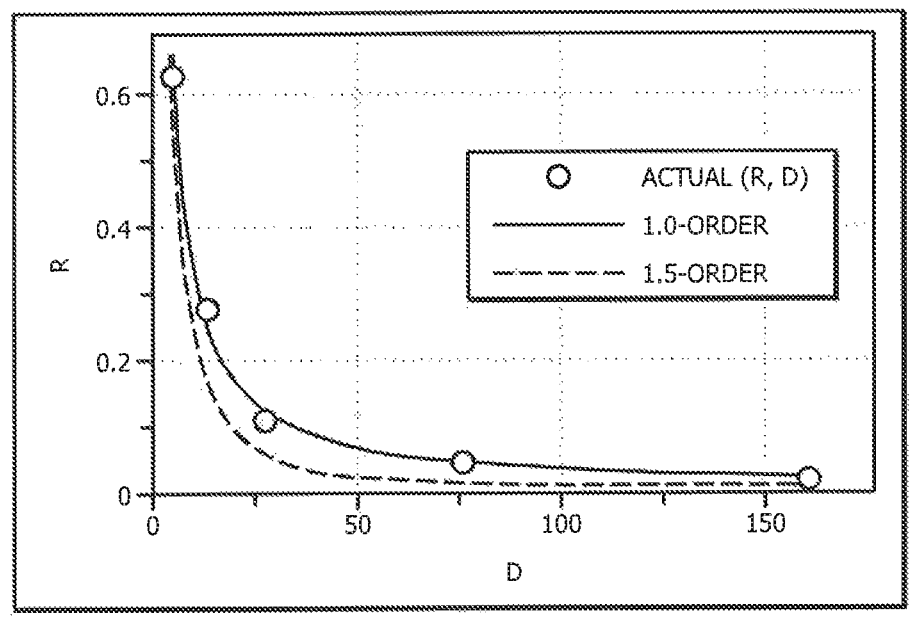
Figure 2D:
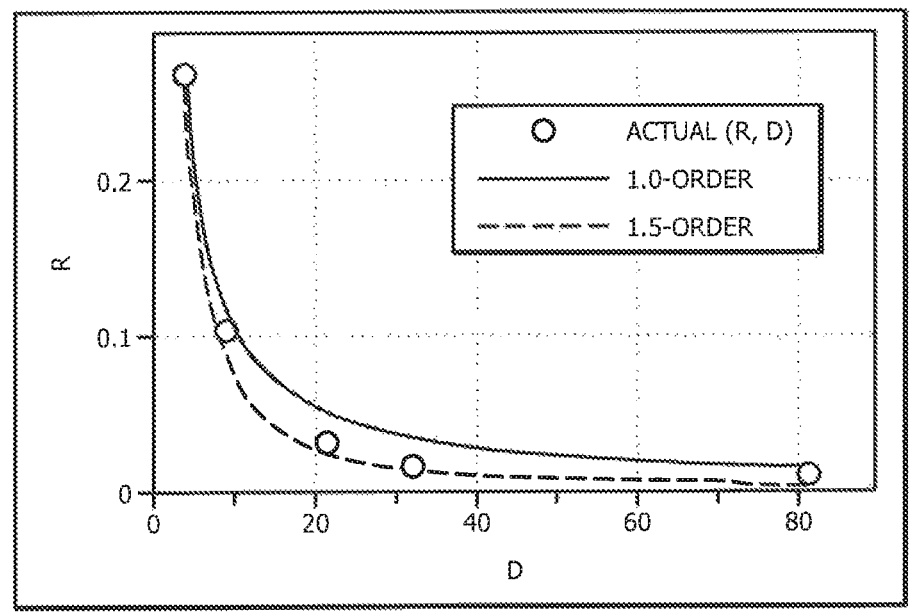

FIGS. 2A and 2B illustrate the R-D relationship modelings for the "PeopleOnStreet" video sequence (QP=20) while FIGS. 2C and 2D illustrate the R-D relationship modelings for the "BaskethallDrill" video sequence (QP=32). In the illustrated examples, in the "PeopleOnStreet" video sequence example, the CTU with index CTUID=16 selects the 1.0-order R-D model (FIG. 2A) and CTU with index CTUID=23 selects the 1.5-order R-D model (FIG. 2B). In the "BasketballDrill" video sequence example, the CTU with index CTUID=21 selects the 1.0-order R-D model (FIG. 2C) and CTU with index CTUID=54 selects the 1.5-order R-D model. Therefore, as can be seen from the illustrated examples, different CTUs may select different R-D models to achieve better curve fitting accuracy results.

Table II below shows the selection percentages in the aforementioned three category classification example (i.e., 1.0-order and 1.5-order R-D models, and SMC) for separate R-D models. In particular, Table II shows the observed R-D relationships for inter frame CTUs from testing of the 18 exemplary video sequences of Table I. The curve fitting accuracy results for 1.0-order and 1.5-order R-D models are compared in Table II. It can be appreciated that the two models can perform differently for different sequences and The fitting accuracy improvements provided by classification schemes implemented to select the best R-D model are also important for fitting accuracy with respect to each individual CTU according to embodiments. For example, for the R-D model based RC optimization, the accurate R-D modelings for CTUs can increase the RC performance. The inaccurate R-D modeling and bit allocation for a few of the CTUs will degrade the total coding performance since the remaining bits and allocated bits are easily influenced for other CTUs. Therefore, the increased fitting accuracy for the R-D modelings provided according to embodiments of the invention will benefit the further RC optimization.

As can be appreciated from the foregoing, embodiments implement a multi-class classifier to discriminate different CTUs into different R-D relationships (e.g., the SMC, 1.0-order R-D model, and 1.5-order R-D model of the above example) to improve the curve fitting accuracy. Accordingly, embodiments of the invention may utilize feature extraction for R-D model classification according to the concepts herein. For example, embodiments of the invention operate to consider features which can indicate coding complexity for implementing the aforementioned feature extraction.

In operation according to embodiments, difference maps are calculated from the adjacent three frames, for example, to extract efficient features from the original YUV values. For example, the absolute difference map (ADM) $\Delta F_i$ may be obtained from the current frame $F_i$ and its previous frame $F_{i-1}$, where i indicates the frame coding sequence, and similarly the ADM $\Delta F_{i-1}$ obtained for the previous frame $F_{i-1}$ and the second previous frame $F_{i-2}$. The selected features according to embodiments of the invention may include the mean and variance values for CTUs in the ADMs $\Delta F_i$ and $\Delta F_{i-1}$, and in the gradient maps for the ADMs (GADMs). Accordingly, the features for R-D model classification according to embodiments herein may be extracted from the two ADMs and the two GADMs for each CTU.

Embodiments of the invention operate to extract features for R-D model classification from two or more difference maps for better learning the R-D model selection and prediction. To aid in understanding the use of two or more difference maps for extracting features according to embodiments, it is helpful to denote the CTU level textural difference between current frame and its previous frame as $\Delta\text{diff}_1$ for the first previous frame, and $\Delta\text{diff}_2$ for the previous second frame. It should be appreciated that if $\Delta\text{diff}_1$ is large, it cannot be assured that the coding complexity is large (e.g., the motion estimation may work well to remove coding redundancy and make the residual have low coding complexity). Therefore, a single $\Delta\text{diff}_1$ may not indicate the coding complexity well. If, however, $\Delta\text{diff}_1$ and $\Delta\text{diff}_2$ are both large, it may indicate the motion estimation can work well, and the coding complexity is low. If $\Delta\text{diff}_1$ is large and $\Delta\text{diff}_2$ is small, the coding complexity may be large. Alternatively, if $\Delta\text{diff}_1$ is small and $\Delta\text{diff}_2$ is large, the coding complexity may be small. If, however, $\Delta\text{diff}_1$ and $\Delta\text{diff}_2$ are both small, the coding complexity may be small. Therefore, at least two difference maps from three frames are helpful for better learning the R-D model selection and prediction according to embodiments herein.

It should be understood that the differences $\Delta\text{diff}_1$ and $\Delta\text{diff}_2$ in the above example reflect the motion magnitudes of the video sequences. A plurality of levels (e.g., 3 levels) to define the strength of motions may be defined with respect to the video stream motion magnitudes. In accordance with some embodiments of the invention, the levels used to define the strength of motions may be the three levels: Drastic, Medium, and Small, wherein Drastic means that the motions in the video sequences are drastic and significant, Small means that the motions in the video sequences are small and insignificant, and Medium means that although the motions in the video sequences are significant they do not rise to the level of drastic. Accordingly, the differences $\Delta\text{diff}_1$ and $\Delta\text{diff}_2$ in the above example may be determined to be large when the motions are determined to correspond to the aforementioned Drastic level or to be small when the motions are determined to correspond to the aforementioned Small level.

Various features, which are highly related to the coding complexity in the R-D model, may be extracted for R-D model classification according to embodiments of the invention. For example, embodiments may operate to extract features including (1) the mean of the ADMs, (2) the standard variance of the ADMs, (3) the square root of the mean of the squared ADMs, (4) the square root of the standard variance of the squared ADMs, (5) the mean of the GADMs, (6) the standard variance of the GADMs, (7) the square root of the mean of the squared GADMs, and/or (8) the square root of the standard variance of the squared GADMs from the aforementioned ADMs and GADMs for each CTU. In operation according to embodiments of the invention, for each YUV component, the above 8 features may be extracted from the two ADMs. A flag may also be used to indicate whether the consumed bits of the previous collocated CTU is below a threshold (e.g., a threshold bpp value, such as 0.005 bpp, as may be established empirically), which can also be other similar values, which is deemed as a highly related feature with the SKIP_Most_CTUs. Therefore, the features for each CTU are extracted with 49 dimensions according to the foregoing example.

It should be appreciated that SVM is an effective tool for a binary classification problem (see e.g., C.-C. Chang and C.-J. "LIBSVM: A library for support vector machines," *ACM Trans. Intell. Syst. Technol.*, vol. 2, no. 3, 2011. (2016, August), the disclosure of which is incorporated herein by reference). Accordingly, a SVM based multi-classification scheme is implemented to predict the R-D models for inter frame CTUs in the machine learning based R-D model prediction operation according to embodiments of the invention. In particular, embodiments utilize one or more multi-classification SVM classifier to improve the R-D modeling accuracy. For example, for the above described exemplary embodiment wherein CTUs are classified into three classifications (e.g., 1.0-order R-D model, 1.5-order R-D model, and SMC), three binary SVM classifiers which discriminate the three different classes with the others separately may be utilized. Additionally or alternatively, a multi-classification SVM classifier may be utilized according to embodiments. Such SVM based classifiers implemented according to embodiments may, for example, be based on the maximization of the margin for the classification hyperplane.

The hyperplane $f(x)=\omega^T\phi(x)+b=0$ is well trained to best discriminate the samples, where x is the input sample vector, $\phi$ is a kernel function, which maps x into a higher dimensional space and introduces the non-linear transformation to improve the learning performance. The bias term is denoted as b, which can adjust the flexibility of the hyperplane.

In the υ-SVM based binary classification problem (see B. Scholkopf, A. Smola, R. C. Williamson, and F. L. Bartlett, "New support vector algorithms," *Neural Computation*, vol. 12, no. 5, pp. 1207-1245, May 2000, the disclosure of which is incorporated herein by reference), the optimal hyperplane is achieved by minimizing the following cost function $$J_1(\omega, b, p, \xi) = \frac{1}{2}\|\omega\|^2 - \upsilon\psi + \frac{1}{L}\sum_{i=1}^{L}\varepsilon_i, \quad (4)$$

$$s, t, y_i(\omega^T\varphi(x_i) + b) \geq \psi - \varepsilon_i, \varepsilon_i \geq 0, i = 1, 2, \ldots, L, \psi \geq 0$$

where $x_i$ are the features for the i-th training samples, $y_i$ is the label and $y_i=\{-1,+1\}$, $\varepsilon_i$ is the non-zero soft margin and slack variable. The margin is adjusted by the parameter $\psi$, which makes the two classes have the margin $2\psi\|\omega\|$. The parameter a can influence the prediction accuracy and the number of selected support vectors, and υ is 0.05 in the experiment as an example. The Gaussian radial basis function (RBF) based kernel function may be used in the υ-SVM classifier of embodiments of the invention.

The final determined label may be achieved by checking the sign of the decision function value, which measures the input sample according to the achieved support vectors and the bias term b. An advantage of using υ-SVM classifier according to embodiments is that the number of support vectors can be adjusted by the parameter υ.

The decision function value (DFV) can be used to measure the distance between the input sample and the hyperplane. Therefore, a distance based one-versus-rest scheme can be used for the multi-classification problem by the binary SVM classifiers utilized according to embodiments to discriminate the three different classes with the others separately. In operation according to embodiments wherein three CTU classifications (e.g., 1.0-order R-D model, 1.5-order R-D model, and SMC) are utilized, for example, SVM classifier #1 (e.g., 1.0-order R-D model), #2 (e.g., 1.5-order R-D model), and #3 (e.g., SMC) can generate three labels, $Label_1$, $Label_2$, and $Label_3$, and three decision function values $DFV_1$, $DFV_2$, and $DFV_3$, respectively. In operation according to embodiments, the final decision label FDL may be determined by the following $$FDL = {}_{i=1,2,3}^{argmax} DFV_i - 1, \quad (5)$$

In the foregoing determination of FDL, the classifier which has the largest DFV may give the final decision multi-classification label (see e.g., Chih-Wei Hsu and Chih-Jen Lin, "A comparison of methods for multiclass support vector machines," *IEEE Trans. on Neural Networks*, vol. 13, no. 2, pp. 415-425, March 2002, the disclosure of which is incorporated herein by reference).

SVM classifiers utilized according to embodiments of the invention provide a high level of classification accuracy. By way of example, Table III below shows classification accuracy results of three separate SVM classifiers and a multi-classification SVM. In particular, Table III shows classification accuracy results with respect to video sequences of Table I and II above in an example scenario wherein the inter frame CTUs from 9 of the video sequences (i.e., "PeopleOnStreet", "BasketballDrive", "Cactus", "ParkScene", "PartyScene", "RaceHorsesC", "BlowingBubbles", "Race Horses", and "Johnny") are used for training, and the CTUs from the other 9 video sequences (i.e., "Traffic", "BQTerrace", "Kimono", "BasketballDrill", "BQMall", "BasketballPass", "BQSquare", "FourPeople", and "KristenAndSara") are used for testing. In Table III, the achieved classification accuracy results are 88.19%, 88.08% and 94.48% for Classifier #1 (e.g., 1.0-order R-D model), #2 (e.g., 1.5-order R-D model), and #3 (SMC), respectively. The classification accuracy from the mixed classifiers for the multi-classification task is 86.24%, which is high enough for the R-D modeling in the RC optimization. It should be appreciated that, when the CTUs are more accurately classified into different R-D model categories, the performance results will be much better in the further R-D model based RC optimization.

TABLE III

CLASSIFICATION ACCURACY RESULTS OF
THE THREE SEPARATE CLASSIFIERS AND
THE MULTI-CLASSIFICATION SVM

| Class | Sequence | Classifier #1 | Classifier #2 | Classifier #3 | Mixed |
|---|---|---|---|---|---|
| A | Traffic | 0.8090 | 0.9570 | 0.9310 | 0.8450 |
| B | BQTerrace | 0.9255 | 0.9882 | 0.9745 | 0.9490 |
|   | Kimono | 0.7706 | 0.8902 | 0.8000 | 0.7255 |
| C | BasketballDrill | 0.9615 | 0.7115 | 0.9423 | 0.8173 |
|   | BQMall | 0.8462 | 0.8654 | 0.9135 | 0.8173 |
| D | BasketballPass | 0.8214 | 0.6786 | 1.0000 | 0.8214 |
|   | BasketballPass | 0.8571 | 0.8571 | 1.0000 | 0.8571 |
| E | FourPeople | 0.9833 | 0.9875 | 0.9708 | 0.9667 |
|   | KristenAndSara | 0.9625 | 0.9917 | 0.9708 | 0.9625 |
|   | Average | 0.8819 | 0.8808 | 0.9448 | 0.8624 |

Cooperative Game Modeling for Inter Frame CTU Level Bit Allocation

As previously mentioned, in a step of a MLGT RC technique implemented by embodiments of the present invention, RC optimization goals are achieved in a game theory modeling and optimization framework. For example, in operation according to embodiments the inter frame CTU level bit allocation problem can be modeled as a cooperative game, where each CTU can be modeled as a player in the bargaining game. Although existing works have adopted single R-D model based bargaining games for the bit allocation optimization (see e.g., W. Gao, S. Kwong, Y. Zhou and H. Yuan, "SSIM-based game theory approach for rate-distortion optimized intra frame CTU-level bit allocation," *IEEE Trans. Multimedia*, vol. 18, no. 6, pp. 988-999, June 2016 and X. Wang, S. Kwong, and Y. Zhang, "Applying game theory to rate control optimization for hierarchical B-pictures," *IEEE Trans. Broadcast.*, vol. 59, no. 4, pp. 591-601, December 2013), such single R-D model based bargaining is not always accurate. As previously discussed, the R-D modeling accuracy is a prerequisite to improve the R-D performances in the further bit allocation optimization. Therefore, in contrast to single R-D model based bargaining, mixed R-D models for inter frame CTUs are adopted for bit allocation optimization according to embodiments of the present invention.

In CTU level bit allocation according to embodiments, each CTU player competes for more bit resources for encoding to improve the coding quality in a frame. However, the target bits for the current frame is a constraint to the competition for bits. It should be appreciated that the excessive bit achievements of some CTUs will greatly impede the bit achievements of the other CTUs, which means that the overall coding quality and utility will be influenced. Therefore, every CTU player should be rational in the bargaining game, and in implementations according to embodiments herein all CTU players work cooperatively to compete for bits to achieve the overall coding quality and utility gains in the frame.

The utility definition is usually related to the coding distortion and quality (see W. Gao, S. Kwong, Y. Zhou and H. Yuan, "SSIM-based game theory approach for rate-distortion optimized intra frame CTU-level bit allocation," *IEEE Trans. Multimedia*, vol. 18, no. 6, pp. 988-999, June 2016). Because different CTUs have different R-D relationships, the same distortion decrease may need different increased bit resources for different CTUs. A bargaining game may be modeled for inter frame CTU level bit allocation in accordance with concepts herein. In embodiments herein, the above described multi-classification based mixed R-D models are used to more accurately depict the relationship between R and D. Therefore, inter frame CTU bit allocation optimization of embodiments takes different R-D relationships into account for different CTUs in the cooperative bargaining game.

In a bargaining game utilized according to embodiments of the invention, each CTU player i (i=1, 2, . . . , N) competes for bit resources rationally to improve its own utility $U_i(r_i)$, where $r_i$ is the consumed bits for the i-th CTU, and then further improve the overall utility in the current frame. The ultimate bargaining result according to embodiments is that the overall utility reaches its optimization limit. In a typical bargaining process, each player would not yield without a limit. Accordingly, in operation according to embodiments, different CTU players have different bargaining abilities due to the different R-D models and coding complexities. However, the minimum utilities $\{U_{i,d}(r_{i,d}), i=1, 2, \ldots, N\}$ (e.g., the minimum utilities, also referred to as disagreement points, are different for different CTU players) are guaranteed in the cooperative game of embodiments, where the $r_{i,d}$ is the minimum bit consumption to achieve the minimum utility $U_{i,d}$ for player i. The remaining bits may be used for further bargaining according to embodiments.

In accordance with embodiments of the invention, the utilities $\{U_i(r_i), i=1, 2, \ldots, N\}$ for all the CTUs form the feasible utility set U, while the minimum utilities $\{U_{i,d}(r_{i,d}), i=1, 2, \ldots, N\}$ form the minimum utility set $U_d$. In operation, all the CTU players with U and $U_d$ may form a N-player cooperative bargaining game in which the Pareto optimal solution $U^*=\{U^*_i(r_i), i=1, 2, \ldots, N\}$ can be achieved by NBS (see e.g., W. Gao, S. Kwong, Y. Zhou and H. Yuan, "SSIM-based game theory approach for rate-distortion optimized intra frame CTU-level bit allocation," *IEEE Trans. Multimedia*, vol. 18, no. 6, pp. 988-999, June 2016 and J. Nash, "The bargaining problem," *Econometrica*, vol. 18, no. 2, pp. 155-162, April 1950), where the maximum overall utility can be achieved. It should be appreciated that the NBS solution is in the feasible utility set. Each CTU player plays rationally according to embodiments to ensure the minimum utility, $U^*_i > U_{i,d}$. Moreover, in the bargaining game of embodiments, the achieved bit allocation scheme forming NBS can achieve the cooperative Pareto optimality in the overall utility.

As discussed with respect to exemplary embodiments above, excepting the CTUs categorized as SKIP_Most_C-TUs, two categories of R-D models may be utilized with respect to the other CTUs (e.g., 1.0-order and 1.5-order R-D models as shown in equations (2) and (3)) according to some implementations of a MLGT RC technique. The utility definition for the i-th CTU can be expressed as $$U_i = 1/D_i, \quad (6)$$

where $D_i$ is the Mean-Squared-Error (MSE) based coding distortion for the i-th CTU. The utility mapping function $f$: $U_i \rightarrow r_i$ can be built to depict the relationship between the utility $U_i$ and the consumed bits $r_i$. From equations (2) and (3) above, two kinds of R-D models are used for all the other CTUs according to this exemplary embodiment, and all utility mapping functions belong to the following two types $$r_i = f_1(U_i) = C_{1,i} U_i, \quad (7)$$

$$r_i = f_2(U_i) = C_{2,i} U_i^{3/2}, \quad (8)$$

where each CTU selects a mapping function.

In a bargaining game implemented according to embodiments of the invention, every CTU will not compromise to reduce its own utility without a limit, and has its own disagreement point, which is the minimum guarantee on the achieved utility. The utility limit on this disagreement point for the i-th CTU of embodiments may be expressed as $$U_{i,d} = 1/D_{i,d}, \quad (9)$$

where $D_{i,d}$ is the maximum allowed coding distortion for the i-th CTU in the bargaining game. From equations (7) and (8) above, the consumed bits $r_{i,d}$ to achieve the utility may be expressed as $$r_{i,d} = f_1(U_{i,d}) = C_{1,i} U_{i,d}, \quad (10)$$

$$r_{i,d} = f_2(U_{i,d}) = C_{2,i} U_{i,d}^{3/2}, \quad (11)$$

In the bargaining game of embodiments, the minimum utility $U_{i,d}$ can be calculated as $$U_{i,d} = \gamma U_{i,pre,adjust} = \frac{\gamma}{\delta D_{i,pre}} \quad (12)$$

where $\gamma$ is set to a constant 0.5. In operation according to embodiments, $U_{i,pre,adjust}$ is adjusted from the utility $U_{i,pre}$ for the i-th CTU in the previous frame, wherein $D_{i,pre}$ is the distortion for $U_{i,pre}$. The adjusting factor of embodiments is defined as $\delta$, which can be roughly expressed as $$\delta = \frac{Q_{step,cur}}{Q_{step,pre}}, \quad (13)$$

where $Q_{step,cur}$ and $Q_{step,pre}$ are the frame level $Q_{step}$ for the previous frame with same temporal level (TL) and the current frame, respectively. As can be appreciated from the foregoing, a reasonable minimum utility definition method may be implemented according to embodiments by the joint consideration on the reference coding distortion and frame level QP change. Such a minimum utility definition of embodiments facilitates maintaining coding quality smoothness and making the CTU level bit allocation competition more reasonable.

Before adopting a NBS to solve the bargaining game of embodiments, the mixed R-D models based utility mapping function in the feasible utility set U should satisfy the convexity condition. In accordance with embodiments of the invention, it is assumed (a theorem that has been proved outside of the present application) that the utility mapping function in the feasible utility set U is convex in the mixed R-D models based cooperative bargaining game implemented in accordance with concepts herein. Therefore, for each CTU which selects a fixed R-D model according to embodiments of the invention, the convexity of the utility function can be satisfied separately. Moreover, because the utility mapping functions $f_1$ and $f_2$ as shown in equations (7) and (8) above are both monotonically increasing functions, all the possible achieved utilities can also be larger than the minimum utility for the disagreement point. After the convexity of the mapping function is proved, the NBS can be used for the bit allocation optimization according to concepts of the present invention.

A mixed R-D models based Nash bargaining solution for bit allocation optimization implemented according to embodiments utilizes D-Q and R-Q models. In understanding the use of D-Q and R-Q models according to embodiments of the invention, it is helpful to understand that the distortion D has a linear relationship with the $Q_{step}$ in HEVC (see W. Gao, S. Kwong, H. Yuan and X. Wang, "DCT coefficient distribution modeling and quality dependency analysis based frame-level bit allocation for HEVC," *IEEE Trans. Circuits Syst. Video Technol.*, vol. 26, no. 1, pp. 139-153, January 2016), as represented by the following $$Q_{step} = k_1 D + k_2, \quad (14)$$

where $k_1$ and $k_2$ are model parameters. It should be appreciated that parameter $k_2$ is very close to zero. Thus, denoting $k=k_1$, equation (14) can be simplified to provide a CTU level D-Q model as $$Q_{step} = kD. \quad (15)$$

Thus, taking into account the R-D models in equations (2) and (3) above, the following R-$Q_{step}$ relationships are provided for the foregoing two R-D models, respectively $$R_i = k_i C_{1,i} / Q_{step,i}, \quad (16)$$

$$R_i = k_i^{3/2} C_{2,i} / Q_{step,i}^{3/2}, \quad (17)$$

The above exemplary SVM based multi-classification technique is considered to provide a particular example of a mixed R-D models based Nash bargaining solution. In operation of a SVM based multi-classification scheme of an exemplary embodiment discussed above, all inter frame CTUs are classified into three categories (e.g., SKIP_Most_CTUs, 1.0-order R-D model, and 1.5-order R-D model). In operation according to embodiments, because SKIP_Most_CTUs have special R-D relationships, the target bits for the SKIP_Most_CTUs are predicted from the collocated CTUs in the previous frame at the same temporal level. Thus, SKIP_Most_CTUs are excluded from the bargaining game optimization implemented according to embodiments, and the remaining bits $R_c$ are calculated as $$R_c = R_f - \sum_{i=1}^{N_{SMC}} r_{SMC,i}, \quad (18)$$

where $R_f$ is the target bits for the current frame, $r_{SMC,i}$ is the predicted target bits for the i-th SKIP_Most_CTU, $N_{SMC}$ is the number of SKIP_Most_CTUs, and $R_c$ is allocated to the CTUs with 1.0-order and 1.5-order R-D models. The SKIP_Most_CTUs will be specially handled according to embodiments. For example, the allocated bits are directly from the collocated CTUs in the previous frame with the same temporal level, and the QP will be the summation of the QP of the collocated CTU in the previous frame with the same temporal level and the frame level QP increment from the previous frame with the same temporal level to the current frame.

When encoding the current frame, embodiments herein have a R-D model order map RDOrder_Map from the SVM multi-classification, and also have the $C_1$ and $C_2$ parameter map C_Map from the previous frame. It should be appreciated that the RDOrder_Map and C_Map are both highly related to the coding complexity of each CTU.

As discussed above, each CTU has its own utility achievement in the bargaining game according to embodiments and the total utility in a frame can be maximized by the bargaining process $$\max \prod_{i=1}^{N} (U_i - U_{i,d}), \text{ s.t. } \begin{cases} r_i \geq r_{i,d} \\ \sum_{i=1}^{N} r_i \leq R_c \\ r_{i,min} \leq r_i \leq r_{i,max} \end{cases} \quad (19)$$

where the maximal frame level utility can be achieved, $r_i$ and $r_{i,d}$ are the allocated bits and minimum utility bits for the i-th CTU, respectively, $U_i$ and $U_{i,d}$ are the achieved utility and the minimum utility, respectively. $R_c$ is the total bit constraint, $r_{i,min}$ and $r_{i,max}$ and are the minimum and maximum allowable bits for the i-th CTU, respectively.

The multiplication maximization may be transformed to the logarithm domain summation maximization, which can be expressed as $$\max \sum_{i=1}^{N} \ln(U_i - U_{i,d}), \text{ s.t. } \begin{cases} r_i \geq r_{i,d} \\ \sum_{i=1}^{N} r_i \leq R_c \\ r_{i,min} \leq r_i \leq r_{i,max} \end{cases} \quad (20)$$

It should be appreciated that this maximization problem can be solved by introducing Lagrange multipliers, as follows $$J_2 = \sum_{i=1}^{N} \ln(U_i - U_{i,d}) + \xi \left( \sum_{i=1}^{N} r_i - R_c \right) + \quad (21)$$
$$\sum_{i=1}^{N} \varphi_i (r_i - r_{i,d}) + \sum_{i=1}^{N} \theta_{1,i} (r_i - r_{i,min}) + \sum_{i=1}^{N} \theta_{2,i} (r_{i,max} - r_i),$$

where $J_2$ can get its maximum when the following Karush-Kuhn-Tucker (KKT conditions [30] are solved $$\begin{cases} \dfrac{\partial J}{\partial r_i} = \dfrac{\partial \ln(U_i - U_{i,d})}{\partial r_i} + \xi + \varphi_i + \theta_{1,i} + \theta_{2,i} = 0 \\ \dfrac{\partial J}{\partial \varphi_i} = r_i - r_{i,d} \geq 0 \\ \varphi_i \dfrac{\partial J}{\partial \varphi_i} = \varphi_i (r_i - r_{i,d}) = 0 \\ \dfrac{\partial J}{\partial \xi} = \sum_{i=1}^{N} r_i - R_c \leq 0 \\ \dfrac{\partial J}{\partial \theta_{1,i}} = \dfrac{\partial}{\partial \theta_{1,i}} (\theta_{1,i}(r_i - r_{i,min})) = 0 \\ \dfrac{\partial J}{\partial \theta_{2,i}} = \dfrac{\partial}{\partial \theta_{2,i}} (\theta_{2,i}(r_{i,max} - r_i)) = 0 \end{cases} \quad (22)$$

The consumed bits $r_i$ is in the range of $(r_{i,min}, r_{i,max})$, and thus $\theta_{1,i}=\theta_{2,i}=0$. Moreover, it can be seen that $\varphi_i$ is also 0. Accordingly, from equations (6) and (9) above $$\dfrac{\partial \ln(U_i - U_{i,d})}{\partial r_i} + \xi = \dfrac{1}{U_i - U_{i,d}} \cdot \dfrac{\partial U_i}{\partial r_i} + \xi = 0. \quad (23)$$

In equations (7) and (8) above, the two types of mapping functions have been given to describe the relationship between U and $r_i$. When the current CTU selects the 1.0-order and 1.5-order R-D models, the $r_i$ can be calculated as $$r_i = C_{1,i} U_{i,d} - \dfrac{1}{\xi}, \quad (24)$$

$$r_i - C_{2,i}^{2/3} U_{i,d} r_i^{1/3} + \dfrac{2}{3\xi} = 0, \quad (25)$$

respectively. It should be appreciated that, in equation (25), the cubic function can be solved by adopting the Cardano's method. It should be appreciated that in solving the cubic function the solution of $r_i$ from $\xi$ can be achieved with expression for the CTUs with the 1.5-order R-D model. Further, it can be appreciated that a monotonically increasing relationship exists between $\xi$ and $r_i$ in equation (25) in the range of $r_i > r_{i,d}$.

For simplicity, the relationships between $\xi$ and $r_i$ in equations (24) and (25) is denoted as $r_i = h_1(\xi)$ and $r_i = h_2(\xi)$, respectively. Whether a CTU selects 1.0-order R-D model or 1.5-order R-D model, the summation of consumed bits in a frame should satisfy the bit constraint requirement in equation (19), according to embodiments herein.

The numbers of CTUs that select the 1.0-order and 1.5-order R-D models may be denoted as $N_1$ and $N_2$, respectively, wherein $N_1+N_2=N$. Grouping the CTUs provides $$R_{cal} = \sum_{m=1}^{N_1} r_{1,m} + \sum_{n=1}^{N_2} r_{2,n} = \sum_{m=1}^{N_1} h_{1,m}(\xi) + \sum_{n=1}^{N_2} h_{2,n}(\xi) \le R_c, \quad (26)$$

where $R_{cal}$ is the bits calculated from the Lagrange multiplier $\gamma$, and $R_{cal}$ can be close to $R_c$ when $\gamma$ is adaptively set.

To obtain the optimized bit allocation scheme for the i-th CTU from equations (24) or (25), the Lagrange multiplier $\xi$ may be achieved from equation (26) to meet the constraint on the consumed bits, where $\xi$ is used for all CTUs. However, this presents a non-numerical solution problem. Accordingly, embodiments of the invention implement an iterative solution search method to achieve this Lagrange multiplier $\xi$ for the inter frame CTU level bit allocation. After achieving the $\xi$ value, the allocated bits for CTUs can be calculated according to embodiments herein.

In providing an iterative solution search technique in accordance with concepts herein, it should be appreciated that, from equations (2) and (3), $C_{1,m} > 0$ and $C_{2,n} > 0$. Therefore, $r_i$ and $\xi$ in equation (24) exhibit a monotonically increasing relationship. Further, it can be appreciated from equation (18) and the bargaining game rule implemented according to embodiments, that $U_i > U_{i,d}$, Thus $$\frac{1}{\xi} = C_{1,i} U_{i,d} - r_i < C_{1,i} U_i - r_i = 0, \quad (27)$$

and $\xi < 0$. It should further be appreciated that in solving the cubic function of equation (25) the range of $\xi$ is $-3^{1/2}/r_{i,d} \le \xi < 0$, and $\xi$ also exhibit a monotonically increasing relationship in the range of $r_i > r_{i,d}$.

From the foregoing, $R_{cal}$ and $\xi$ exhibit a monotonically increasing relationship in equation (26). The iterative solution search method of embodiments utilizes this monotonically increasing relationship for implementing an optimized bit allocation scheme. In operation of an iterative solution search method according to embodiments, the search method can find the best $\xi$ that can make the total consumed bits $R_{cal}$ be close to the target bits $R_c$ for the CTUs with 1.0-order and 1.5-order R-D models in a frame. From the foregoing, the range of $\xi$ is $-3^{1/2}/r_{i,d} \le \xi < 0$. The best is searched in the estimated range by an iterative solution search method of embodiments. In operation according to such a method of embodiments, a set of $\xi_i$ values can be obtained because the previous frame already has the values of $R_i$, and $C_{1,i}$ or $C_{2,i}$. The minimum and maximum $\xi$ values may be denoted as $\xi_{min}$ and $\xi_{max}$, respectively and may be scaled as $$\xi_{min} = \xi_{min}/s_{min}, \quad (28)$$

$$\xi_{max} = s_{max} \xi_{max} \quad (29)$$

where $s_{min}$ and $s_{max}$ are scaling factors (e.g., $s_{min} = s_{min} = 10$ according to one example herein).

Based on the $\xi$ value, the consumed bits may be calculated from the following function $g(\xi)$, $$g(\xi) = \sum_{m=1}^{N_1} h_{1,m}(\xi) + \sum_{n=1}^{N_2} h_{2,n}(\xi). \quad (30)$$

In operation of a mixed R-D models based Nash bargaining solution utilizing an iterative solution search method according to embodiments herein, the $\xi_{min}$ and $\xi_{max}$ will get the $g(\xi_{min}) = R_{min}$ and $g(\xi_{min}) = R_{max}$, respectively. The mean of $\xi_{min}$ and $\xi_{max}$ which may be denoted as $\xi_{mid}$, may be obtained and half division may be conducted along the iteration search process according to embodiments (it is appreciated that the monotonically increasing characteristic is helpful for the searching of the optimal $\xi$ value). The iteration time may be recorded as Iter and its maximum number may be denoted as Iter_max. In operation according to embodiments of an iterative solution search method, as the iteration search is conducted, the searching range $[\xi_{min}, \xi_{max}]$ becomes smaller. As an example, Iter_max may be set to 20 and the precision of the achieved $\xi$ can reach to $(\xi_{max} - \xi_{min})/2^{20}$.

In light of the foregoing, an iterative search algorithm in accordance with the example provided below may be utilized according to embodiments to find the best $\xi$ to meet the frame level constraint on the consumed bits.

Input:
 The $\xi$ range: $[\xi_{min}, \xi_{max}]$, and $\xi_{mid} = \text{mean}(\xi_{min}, \xi_{max})$
 The current frame level constraint bits for CTUs with 1.0-order and 1.5-order R-D models: $R_c$
Output:
 The best Lagrange Multiplier: $\xi_{best}$
1: for Iter$\in$[1, Iter_max] do
2: Calculate the consumed bits $g(\xi_{min})$, $g(\xi_{max})$, $g(\xi_{mid})$ for $\xi_{min}, \xi_{max}, \xi_{mid}$;
3: $R_c < g(\xi_{mid})$ and $R_c > g(\xi_{min})$
4: $\xi_{max} = \xi_{mid}, \xi_{min} = \xi_{min}$;
5: else if $R_c < g(\xi_{max})$ and $R_c > g(\xi_{mid})$
6: $\xi_{max} = \xi_{max}, \xi_{min} = \xi_{mid}$;
7: else if $R_c < g(\xi_{min})$ In the above example iterative solution search algorithm, an iterative solution search method is given where the $\xi_{min}, \xi_{max}, \xi_{mid}$ values are updated in each iteration step by comparing the calculated bits and the bit constraint $R_c$. $\xi_{min}$ can achieve the minimum bits, while $\xi_{max}$ achieves the maximum bits. If the optimal $\xi$ is not in the range of $[\xi_{min}, \xi_{max}]$, the range is extended by the factors $e_{min}$ and $e_{max}$ for $\xi_{min}$ and $\xi_{max}$, respectively. In operation according to the example algorithm, the finally achieved $\xi_{mid}$ is denoted as the best $\xi$ value $\xi_{best}$.

After the best $\xi$ is achieved (e.g., through operation of the above algorithm), equations (24) and (25) may be utilized to determine the allocated bits for the i-th CTU according to embodiments. In operation of embodiments of the invention, the allocated bits for the i-th CTU can be constrained by $$r_{i,opt} = \max(r_{i,min}, \min(\max(r_{i,d}, r_i), r_{i,max})), \quad (31)$$

where and $r_{i,min}$ and $r_{i,max}$ are the bit constraints from the previous frame with the same TL, $r_{i,opt}$ is the achieved optimal bits for the i-th CTU from the cooperative bargaining game.

From equations (16) and (17) above, the consumed bits R have a relationship with $Q_{step}$. Accordingly, an estimated bit target $r_{i,est}$ may be given as $$r_{i,est} = \frac{r_{i,ref}}{\delta^\eta}, \quad (32)$$

where $\delta$ is defined in equation (12), $r_{i,ref}$ is the consumed bits from the referenced CTU, $\eta$ is equal to 1.0 and 1.5 for the 1.0-order and 1.5-order R-D models in the above example, respectively. In light of the foregoing, $r_{i,min}$ and $r_{i,max}$ of embodiments may be set as $$r_{i,min} = (1 - P_{min}) r_{i,est}, \quad (33)$$

$$r_{i,max} = (1 + P_{max}) r_{i,est}, \quad (34)$$

where $P_{min}$ and $P_{max}$ are the allowable range percentages for the minimum and maximum bit constraints, respectively.

It should be understood that the above exemplary bit allocation scheme is utilized with respect to the CTUs which select 1.0-order and 1.5-order R-D models of the example a MLGT RC implementation. For CTUs of the SKIP_Most_CTUs category, the bit budgets are the same as the collocated CTUs in the previous frame with same TL, according to embodiments herein.

Bit allocation and QP determination may be performed according to embodiments of the invention after obtaining the solution to the Lagrange multiplier $\xi$. For example, after the solution of the Lagrange multiplier $\xi$ is achieved by above described iterative search method, the optimized allocated bits $R_{i,opt}$ for CTUs may be calculated from equations (24) and (25) above. The parameter and $C_{1,i}$ and $C_{2,i}$ may be achieved from the C_Map.

In operation according to embodiments of the invention, the bit weight $BW_i$ for the i-th CTU is obtained from the $r_{i,opt}$ in equation (31) as follows $$BW_i = \frac{r_{i,opt}}{\sum_{j=1}^{N} r_{j,opt}} \quad (35)$$

A two-stage remaining bit refinement method may be used for the CTU level bit allocation for inter frames according to embodiments of the invention. The target remaining bits $TRB_i$ for the i-th CTU may, for example, be calculated as $$TRB_i = \frac{\sum_{k=i}^{N} BW_k}{\sum_{j=1}^{N} BW_j} R_c, \quad (36)$$

where $R_c$ is the target frame constraint for the CTUs with, continuing with the above example exemplary classifications, 1.0-order and 1.5-order R-D models in the current frame. The target remaining bits may be achieved by assuming all CTUs are encoded by consuming the optimized bits. However, in practice, such accurate bit achievement may not be realized. Therefore, embodiment may not use the pre-calculated bits for the other remaining CTUs. The mismatch between the target remaining bits $TRB_i$ and the actual remaining bits $ARB_i$ are compensated for according to embodiments of the invention by adopting a smoothing window. For example, the refined remaining bits $RRB_i$ can be achieved by adopting a CTU-level smoothing window to compensate the bit gap between $TRB_i$ and $ARB_i$. A calculation method for $RRB_i$ utilized according to embodiments is $$RRB_i = ARB_i + (ARB_i - TRB_i)NRC/SWS, \quad (37)$$

where NRC is the number of remaining CTUs, and SWS is the CTU smooth window size. Such smoothing window may be utilized to help improve the quality smoothness and bit accuracy.

The final optimized bits $R_{i,opt}$ for i-th CTU can be achieved according to embodiments by the $RRB_i$ and the bit weight $BW_i$, as follows:

$$r_{i,opt} = \frac{BW_i}{\sum_{j=i}^{N} BW_j} RRB_i \quad (38)$$

From equations (16) and (17), the $Q_{step}$ may be obtained from the allocated bits R for two R-D models, respectively, $$Q_{step,i} = k_i C_{1,i}/R_i, \quad (39)$$

$$Q_{step,i} = k_i (C_{2,i}/R_i)^{2/3}, \quad (40)$$

where $k_i$ is from the CTU level D-Q model in equation (15), and $C_{1,i}$ and $C_{2,i}$ are achieved from the C_Map. The $Q_{step}$ and QP for the current CTU may be determined according to embodiments based on equations (38), (39) and (40) above.

In operation of MLGT RC implementations of embodiments of the invention, more bit resources are expected to be allocated to inter frames to best exploit the potential of the joint machine learning and game theory modeling framework to improve the R-D performance of inter frames. For example, the intra frame QP is adjusted to be increased by 5 in experimental results (see below) when compared with the original HM16.8.

For the inter frame RC, adaptive hierarchical bit ratios are adopted for the inter frames in LB coding structure according to embodiments. For example, the adaptive bit ratios may be set for different frames in a GOP according to the bits per pixel (bpp) value ranges. Table IV below shows an example adaptive bit ratios set for different frames in a GOP, where GOP size=4.

TABLE IV

THE BPP BASED FRAM LEVEL ADAPTIVE BIT RATIOS FOR FRAMES IN GOP

| Frame ID | bpp > 0.25 | 0.12 < bpp ≤ 0.25 | 0.06 < bpp ≤ 0.12 | bpp ≤ 0.06 |
|---|---|---|---|---|
| 0 | 2 | 2 | 2 | 2 |
| 1 | 3 | 3 | 3 | 3 |
| 2 | 2 | 2 | 4 | 2 |
| 3 | 4 | 6 | 8 | 10 |

The above adjustments on intra and inter frames may be utilized according to embodiments to allow inter frames to have more bit resources, such as to facilitate the MLGT RC method better exploiting the performance potentials and/or to provide the inter frames with smoother results on the consumed bits and coding quality.

MLGT RC techniques implemented in accordance with the foregoing provide inter frame CTU level bit allocation and RC. The MLGT based inter frame CTU level RC method of embodiments may be utilized in providing improved R-D performance, smoothness quality, bit rate accuracy, and/or buffer control results than existing one-pass RC methods, as supported by the experimental results discussed below.

To illustrate the performance of MLGT RC techniques of embodiments of the invention for HEVC, exemplary MLGT based RC optimization methods in accordance with the concepts herein have been experimentally implemented it in the latest HM16.8 platform (HM Reference Software 16.8. (2016, August)). In testing the exemplary MLGT based RC optimization methods, five different RC methods were implemented and tested for performance comparisons. In particular, in addition to an exemplary MLGT based RC optimization method, a benchmark which adopts the Rλ model based RC in the original HM16.8 (HM16.8-RLRC) was also tested. Further, two other state-of-the-art RC optimization methods in HM16.8 have been implemented for comparisons, including a RC optimization method denoted "TIP16-Wang" (see M. Wang, K. N. Ngan and H. Li, "Low-delay rate control for consistent quality using distortion-based Lagrange multiplier," *IEEE Trans. Image Process.*, vol. 25, no. 7, pp. 2943-2955, July 2016, the disclosure of which is incorporated herein by reference) and a RC optimization method denoted "TIP13-Seo" (see C. W. Seo, J. H. Moon and J. K. Han, "Rate control for consistent objective quality in High Efficiency Video Coding," *IEEE Trans. Image Process.*, vol. 22, no. 6, pp. 2442-2454, June 2013, the disclosure of which is incorporated herein by reference). As a reference, the FixedQP method (see W. Gao, S. Kwong, H. Yuan and X. Wang, "DCT coefficient distribution modeling and quality dependency analysis based frame-level bit allocation for HEVC," *IEEE Trans. Circuits Syst. Video Technol.*, vol. 26, no. 1, pp. 139-153, January 2016 and W. Gao, S. Kwong, Y. Zhou and H. Yuan, "SSIM-based game theory approach for rate-distortion optimized intra frame CTU-level bit allocation," *IEEE Trans. Multimedia*, vol. 18, no. 6, pp. 988-999, June 2016), which encodes the video sequences multiple times with different fixed QPs to achieve the optimal coding scheme with the smallest bit rate mismatch, was also tested. The FixedQP method usually provides the best R-D performances and quality smoothness results for most of the cases, but the disadvantages of this method are the extreme long time consumption from multiple encoding attempts and the inaccuracy on bit rate achievements. Therefore, the FixedQP method was tested to provide the limits for R-D performances and quality smoothness.

The LB coding structures were tested for the proposed low delay RC algorithm optimization and comparisons with the other state-of-the-art RC methods. The coding parameters settings utilized for the testing were as follows, the profile is main, CTU size is 64, CTU maximum depth is 4, intra period is 32, fast search is enabled, adaptive hierarchical bit allocation is enabled, CTU level rate control is open, CTU separate model is enabled, initial QP setting is from adaptive calculation.

The results of the R-D performance, coding quality consistency, bit rate accuracy, coding complexity and buffer occupancy are compared and analyzed for the foregoing different RC methods are discussed below.

With respect to analysis of the R-D performance, the Bjøntegaard delta peak-signal-to-noise-ratio (BD-PSNR) (dB) and Bjøntegaard delta structural similarity (BD-SSIM) results are listed in Table V below for the TIP16-Wang, TIP13-Seo, MLGT, and FixedQP RC methods, compared with the benchmark HM16.8-RRC, on the same HM16.8 platform. From the results in Table V, it can be seen that the exemplary MLGT RC method can, on average, achieve 0.334 dB BD-PSNR and 0.0027 BD-SSIM gains, respectively, which are very remarkable and very close to the R-D performance limits given by FixedQP, which achieves 0.366 dB and 0.0030 on BD-PSNR and BIS-SSIM, respectively. The other two state-of-the-art one-pass RC methods, TIP16-Wang and TIP13-Seo, have much worse R-D performance than the benchmark HM16.8-RLRC method. Therefore, it is apparent that the exemplary MLGT RC method works better than these one-pass RC methods with respect to the R-D performance in terms of both BD-PSNR and BD-SSIM, and the achieved R-D performance gains are very close to those from the multiple-pass FixedQP method.

TABLE V

THE R-D PERFORMANCE COMPARISONS FOR DIFFERENT RC METHOD TO HM 16.8-RLRC

| Class | Sequences | TIP16-Wang | | TIP13-Seo | | Proposed MLGT | | FixedQP | |
|---|---|---|---|---|---|---|---|---|---|
| | | BD-PSNR | BD-SSIM | BD-PSNR | BD-SSIM | BD-PSNR | BD-SSIM | BD-PSNR | BD-SSIM |
| A | PeopleOnStreet | -0.923 | -0.0160 | 0.154 | 0.0021 | 0.461 | 0.0047 | 0.543 | 0.0042 |
| | Traffic | 0.094 | 0.0002 | 0.251 | 0.0008 | 0.328 | 0.0002 | 0.436 | 0.0011 |
| | Average | -0.414 | -0.0079 | 0.203 | 0.0015 | 0.395 | 0.0024 | 0.490 | 0.0026 |
| B | BasketballDrive | -0.681 | -0.0116 | -0.548 | -0.0060 | 0.301 | 0.0025 | 0.373 | 0.0034 |
| | BQTerrace | -0.377 | -0.0031 | 1.364 | 0.0031 | 1.018 | 0.0019 | 0.962 | 0.0018 |
| | Cactus | -0.073 | -0.0013 | -0.167 | -0.0014 | 0.626 | 0.0029 | 0.463 | 0.0023 |
| | Kimono | -1.108 | -0.0082 | -0.994 | -0.0061 | 0.064 | -0.0010 | 0.250 | 0.0005 |
| | ParkScene | -0.819 | -0.0083 | -3.715 | -0.0286 | 0.074 | -0.0010 | 0.139 | 0.0005 |
| | Average | -0.612 | -0.0065 | -0.812 | -0.0078 | 0.417 | 0.0010 | 0.437 | 0.0017 |
| C | BasketballDrill | -0.059 | 0.0002 | 0.001 | 0.0000 | 0.043 | 0.0016 | -0.184 | -0.0001 |
| | BQMall | -0.269 | -0.0091 | 0.357 | 0.0047 | 0.409 | 0.0053 | 0.426 | 0.0062 |
| | PartyScene | -0.365 | -0.0050 | 0.457 | 0.0082 | 0.642 | 0.0124 | 0.490 | 0.0102 |
| | RaceHorsesC | -0.681 | -0.0116 | 0.047 | 0.0015 | 0.125 | 0.0030 | 0.278 | 0.0047 |
| | Average | -0.343 | -0.0064 | 0.215 | 0.0036 | 0.305 | 0.0056 | 0.253 | 0.0053 |
| D | BasketballPass | -0.089 | -0.0019 | 0.121 | 0.0032 | 0.104 | 0.0033 | -0.083 | 0.0046 |
| | BlowingBubble | -0.409 | -0.0025 | -0.086 | -0.0003 | 0.315 | 0.0042 | 0.386 | 0.0055 |
| | BQSquare | 0.312 | 0.0026 | 0.986 | 0.0071 | 0.809 | 0.0064 | 0.834 | 0.0061 |
| | RaceHorses | -0.105 | -0.0036 | -0.320 | -0.0067 | 0.137 | 0.0024 | 0.313 | 0.0043 |
| | Average | -0.073 | -0.0014 | 0.175 | 0.0008 | 0.341 | 0.0041 | 0.362 | 0.0051 |
| E | FourPeople | 0.383 | 0.0009 | 0.159 | 0.0001 | 0.587 | 0.0016 | 0.316 | 0.0010 |
| | Johnny | 0.250 | 0.0001 | -0.573 | -0.0003 | -0.058 | -0.0001 | 0.290 | 0.0000 |
| | KristenAndSara | 0.426 | 0.0003 | -0.300 | -0.0003 | 0.109 | -0.0001 | 0.264 | 0.0000 |
| | Average | 0.353 | 0.0004 | -0.238 | -0.0002 | 0.213 | 0.0005 | 0.290 | 0.0003 |
| | Total Average | -0.218 | -0.0043 | -0.091 | -0.0004 | 0.334 | 0.0027 | 0.366 | 0.0030 |

The R-D performance gains from the exemplary MLGT RC methods result from multiple reasons. One such reason is that the detailed R-D models for different CTUs in B frames learned from SVM based multi-classification schemes of embodiments herein are considered to be treated discriminatively. Another such reason is that the CTU level bit allocation of embodiments is optimized by the cooperative bargaining game to achieve better R-D performance. Still another such reason is that QPs for intra frames are decreased to make more bit resources be allocated to inter frames allowing the MLGT bit allocation scheme of embodiments to exploit the potentials to improve RC performance.

and SSIM metrics (denoted as S_PSNR (dB) and S_SSIM, respectively) were used to evaluate the video quality smoothness with respect to the RC methods implemented and tested for performance comparisons. In Table VI below, the quality smoothness results are given for different RC methods. Since the FixedQP method adopts the same QP for all frames, it achieves the minimal quality fluctuation results for almost all sequences. The fluctuations of the FixedQP method are mainly from the different D-Q model parameters, which are originated from the different prediction residuals with different coding complexities. In general, FixedQP can provide quality smoothness limits for all the other one-pass RC methods.

TABLE VI

THE CODING QUALITY FLUCTUATION COMPARISIONS FOR DIFFERENT RC METHODS

| Class | Sequences | HM16.8 S PSNR | HM16.8 S SSIM | TIP16-Wang S PSNR | TIP16-Wang S SSIM | TIP13-Seo S PSNR | TIP13-Seo S SSIM | Proposed MLGT S PSNR | Proposed MLGT S SSIM | Fixed QP S PSNR | Fixed QP S SSIM |
|---|---|---|---|---|---|---|---|---|---|---|---|
| A | PeopleOnStreet | 1.948 | 0.0160 | 2.660 | 0.0268 | 1.595 | 0.0116 | 1.356 | 0.0105 | 2.791 | 0.0055 |
|   | Traffic | 1.612 | 0.0069 | 1.767 | 0.0089 | 0.990 | 0.0040 | 0.520 | 0.0016 | 0.330 | 0.0009 |
|   | Average | 1.780 | 0.0114 | 2.213 | 0.0178 | 1.292 | 0.0078 | 0.938 | 0.0061 | 0.560 | 0.0032 |
| B | BasketballDrive | 1.669 | 0.0082 | 3.040 | 0.0293 | 2.039 | 0.0148 | 1.334 | 0.0063 | 0.899 | 0.0041 |
|   | BQTerrace | 0.792 | 0.0023 | 1.213 | 0.0056 | 0.881 | 0.0049 | 0.541 | 0.0025 | 0.618 | 0.0032 |
|   | Cactus | 1.182 | 0.0051 | 1.619 | 0.0072 | 1.417 | 0.0067 | 0.580 | 0.0020 | 0.382 | 0.0015 |
|   | Kimono | 1.222 | 0.0043 | 2.777 | 0.0187 | 2.016 | 0.0096 | 1.138 | 0.0042 | 0.906 | 0.0031 |
|   | ParkScene | 1.001 | 0.0053 | 2.018 | 0.0177 | 1.279 | 0.0090 | 0.625 | 0.0037 | 0.431 | 0.0026 |
|   | Average | 1.173 | 0.0052 | 2.134 | 0.0157 | 1.527 | 0.0090 | 0.844 | 0.0037 | 0.647 | 0.0029 |
| C | BasketballDrill | 1.314 | 0.0101 | 1.064 | 0.0149 | 1.479 | 0.0124 | 0.789 | 0.0054 | 0.549 | 0.0042 |
|   | BQMall | 1.720 | 0.0145 | 2.204 | 0.0371 | 1.217 | 0.0074 | 0.996 | 0.0065 | 0.557 | 0.0035 |
|   | PartyScene | 1.201 | 0.0188 | 2.237 | 0.0176 | 0.945 | 0.0136 | 0.593 | 0.0077 | 0.490 | 0.0077 |
|   | RaceHorsesC | 1.397 | 0.0210 | 3.040 | 0.0293 | 1.326 | 0.0196 | 1.023 | 0.0156 | 0.920 | 0.0155 |
|   | Average | 1.408 | 0.0161 | 2.136 | 0.0247 | 1.242 | 0.0133 | 0.850 | 0.0088 | 0.629 | 0.0077 |
| D | BasketballPass | 2.441 | 0.0236 | 2.794 | 0.0245 | 2.245 | 0.0186 | 2.044 | 0.0182 | 0.970 | 0.0070 |
|   | BlowingBubbles | 1.456 | 0.0142 | 1.406 | 0.0110 | 1.643 | 0.0157 | 0.950 | 0.0094 | 0.486 | 0.0045 |
|   | BQSquare | 1.872 | 0.0138 | 1.101 | 0.0048 | 1.080 | 0.0081 | 0.971 | 0.0058 | 0.307 | 0.0019 |
|   | RaceHorses | 1.224 | 0.0130 | 1.531 | 0.0199 | 1.438 | 0.0187 | 0.886 | 0.0104 | 0.787 | 0.0104 |
|   | Average | 1.749 | 0.0162 | 1.708 | 0.0151 | 1.602 | 0.0152 | 1.213 | 0.0109 | 0.638 | 0.0059 |
| E | FourPeople | 1.776 | 0.0052 | 1.269 | 0.0026 | 1.899 | 0.0055 | 0.582 | 0.0012 | 0.337 | 0.0009 |
|   | Johnny | 1.006 | 0.0005 | 0.332 | 0.0004 | 1.587 | 0.0010 | 0.810 | 0.0005 | 0.285 | 0.0002 |
|   | KristenAndSara | 1.306 | 0.0010 | 1.179 | 0.0009 | 1.736 | 0.0014 | 0.697 | 0.0006 | 0.338 | 0.0004 |
|   | Average | 1.362 | 0.0022 | 1.037 | 0.0013 | 1.741 | 0.0026 | 0.696 | 0.0008 | 0.320 | 0.0005 |
|   | Total Average | 1.495 | 0.0102 | 1.846 | 0.0149 | 1.481 | 0.0096 | 0.908 | 0.0061 | 0.559 | 0.0041 |

It should be appreciated that FixedQP provides R-D performance limits, and the exemplary MLGT RC method can achieve very close results as shown in Table V. However, the FixedQP method needs multiple coding attempts using different QPs to achieve the closest bit rate to the target bit rate. The best R-D performance can be usually achieved by sacrificing mach more encoding time than all the other one-pass RC methods. This drawback makes FixedQP not suitable for many practical multimedia processing applications.

From the forgoing analysis of the R-D performance, it can be appreciated that the exemplary MLGT RC method achieves significant R-D performance gains in terms of both BD-PSNR and BD-SSIM, and has R-D performance that is very close to the R-D performance limits from the FixedQP method and that is much better than all the other one-pass RC methods.

The quality consistency reflects the smoothness of the achieved frame level PSNR and SSIM results, which is an important factor to evaluate the video quality to human visual experience. The standard variance results for PSNR In Table VI, it can be seen that for all the one-pass RC methods, the TIP16-Wang method has the maximum fluctuations, while the exemplary MLGT RC method achieves the minimal fluctuations in terms of both S_PSNR and S_SSIM, which are 0.908 dB and 0.0061, respectively. The achieved reductions on quality fluctuations from the exemplary MLGT RC method are very remarkable, and very close to the FixedQP method, which achieves 0.559 dB and 0.0041 on S_PSNR and S_SSIM, respectively.

The decreases in the quality fluctuations for the exemplary MLGT RC method originate from various reasons. One such reason is that the QP settings for intra frames are increased according to embodiments, which makes the following B frames have more bit resources for encoding and their allocated QP values become much more closer to intra frame QP. Therefore, the quality differences between intra and inter frames become smaller. Another such reason is that the adaptive bit ratios for the frames in a GOP of embodiments are set closer than those in the HM16.8-RLRC method, which can reduce the quality fluctuations. Still another such reason is that the minimum utility is defined by the reference coding distortion and frame level QP change according to embodiments, which makes the bit allocation for CTUs in the current frame be more accurate, as well as the frame level bit allocation. Therefore, this definition method can reduce the possibility of the quality fluctuation increases from the cases of insufficient or excessive bit resources.

From the forgoing analysis of the quality smoothness, it can be appreciated that the exemplary MLGT RC achieves visual quality fluctuations in terms of both S_PSNR and S_SSIM that are very close to the quality fluctuation limits from the FixedQP method, and that are much lower than all the other state-of-the-art one-pass RC methods.

The bit rate achievement accuracy is an important performance metric in RC. The actual achieved bit rate results should be very close to the target bit rates. If the mismatch between the actual bit rate and the target bit rate is larger, the RC method is generally not desirable.

The bit rate accuracy results for the RC methods implemented and tested are compared in Table VII. From the results of Table VII it can be seen that the exemplary MLGT RC method can achieve the highest bit rate achievement result in average, which is up to 98.734%.

TABLE VII

THE BIT RATE ACCURACY COMPARISONS
FOR DIFFERENT RC METHODS

| Class | Sequences | HM16.8-RLRC | TIP16-Wang | TIP13-Seo | Proposed MLGT | FixedQP |
|---|---|---|---|---|---|---|
| A | PeopleOnStreet | 99.022 | 79.018 | 99.997 | 99.746 | 97.467 |
|   | Traffic | 98.663 | 99.761 | 99.667 | 95.956 | 98.862 |
|   | Average | 98.843 | 89.390 | 99.832 | 97.851 | 98.164 |
| B | BasketballDrive | 99.989 | 92.971 | 99.326 | 98.059 | 99.093 |
|   | BQTerrace | 88.349 | 89.214 | 99.990 | 98.269 | 96.524 |
|   | Cactus | 99.056 | 95.119 | 96.727 | 97.242 | 96.110 |
|   | Kimono | 99.998 | 98.569 | 99.999 | 95.227 | 98.221 |
|   | ParkScene | 99.999 | 99.075 | 87.007 | 95.857 | 95.330 |
|   | Average | 97.478 | 94.990 | 96.610 | 96.931 | 97.056 |
| C | BasketballDrill | 99.988 | 81.681 | 99.994 | 99.919 | 97.339 |
|   | BQMall | 99.931 | 93.509 | 99.998 | 99.534 | 95.556 |
|   | PartyScene | 94.039 | 88.747 | 97.177 | 99.924 | 96.854 |
|   | RaceHorsesC | 99.995 | 92.971 | 99.998 | 99.924 | 94.745 |
|   | Average | 98.488 | 89.227 | 99.292 | 99.825 | 96.124 |
| D | BasketballPass | 99.981 | 85.460 | 99.962 | 99.974 | 95.880 |
|   | BlowingBubbles | 98.320 | 82.378 | 97.276 | 98.746 | 96.534 |
|   | BQSquare | 91.471 | 58.739 | 99.583 | 99.000 | 97.074 |
|   | RaceHorses | 99.993 | 83.946 | 99.993 | 99.901 | 97.844 |
|   | Average | 97.441 | 77.631 | 99.204 | 99.630 | 96.833 |
| E | FourPeople | 90.399 | 91.029 | 85.050 | 99.979 | 97.774 |
|   | Johnny | 96.250 | 99.136 | 34.886 | 98.344 | 97.971 |
|   | KristenAndSara | 92.861 | 98.808 | 73.271 | 99.976 | 98.001 |
|   | Average | 93.170 | 96.324 | 64.402 | 99.433 | 97.915 |
|   | Total Average (%) | 97.084 | 89.512 | 91.868 | 98.734 | 97.218 |

The computational complexity can be measured by the encoding time. For fairness and accuracy, the results were collected from the separate simulations on a personal computer with an Intel CORE i3-2330M CPU at 2.2 GHz and 6 G RAM memory for different sequences.

The encoding complexity results for different RC methods are compared in Table VIII below. In the results of Table VIII, the computational time ratios were calculated by comparing with the benchmark HM16.8-RLRC method. It can be seen that, on average, the TIP16-Wang method has 3.68% increase, the TIP13-Seo method has 0.58% increase, and the exemplary MLGT RC method has 5.01% increase, respectively.

From the foregoing analysis of bit rate accuracy and computational complexity it can be appreciated that all the one-pass RC methods have the same level coding complexity results and the complexity increases are all negligible in practical encoding. Moreover, since the multiple attempts to achieve the best coding parameters, the FixedQP method has multiple times of coding complexity.

TABLE VIII

THE ENCODING COMPLEXITY COMPARISONS FOR
DIFFERENT RC METHODS TO HM16.8-RLRC

| Class | Sequence | HM16.8- | TIP16- | TIP13- | Proposed MLGT |
|---|---|---|---|---|---|
| A | PeopleOnStreet | 100.00 | 102.60 | 100.53 | 103.74 |
|   | Traffic | 100.00 | 100.38 | 100.90 | 104.33 |
|   | Average | 100.00 | 101.49 | 100.72 | 104.04 |
| B | BasketballDrive | 100.00 | 101.07 | 100.68 | 107.58 |
|   | BQTerrace | 100.00 | 101.48 | 100.48 | 103.30 |
|   | Cactus | 100.00 | 100.03 | 100.22 | 105.17 |
|   | Kimono | 100.00 | 94.58 | 100.22 | 102.18 |
|   | ParkScene | 100.00 | 96.24 | 99.85 | 101.88 |
|   | Average | 100.00 | 98.68 | 100.29 | 104.02 |

TABLE VIII-continued

THE ENCODING COMPLEXITY COMPARISONS FOR
DIFFERENT RC METHODS TO HM16.8-RLRC

| Class | Sequence | HM16.8- | TIP16- | TIP13- | Proposed MLGT |
|---|---|---|---|---|---|
| C | BasketballDrill | 100.00 | 100.82 | 100.84 | 108.45 |
|   | BQMall | 100.00 | 103.50 | 100.34 | 105.19 |
|   | PartyScene | 100.00 | 117.33 | 101.36 | 105.43 |
|   | RaceHorseC | 100.00 | 104.93 | 100.93 | 106.68 |
|   | Average | 100.00 | 106.64 | 100.87 | 106.44 |
| D | BasketballPass | 100.00 | 100.68 | 100.50 | 103.78 |
|   | BlowingBubbles | 100.00 | 111.86 | 101.15 | 106.87 |
|   | BQSquare | 100.00 | 112.20 | 100.74 | 107.58 |
|   | RaceHorses | 100.00 | 114.96 | 100.46 | 105.05 |
|   | Average | 100.00 | 109.93 | 100.71 | 105.82 |

TABLE VIII-continued

THE ENCODING COMPLEXITY COMPARISONS FOR
DIFFERENT RC METHODS TO HM16.8-RLRC

| Class | Sequence | HM16.8- | TIP16- | TIP13- | Proposed MLGT |
|---|---|---|---|---|---|
| E | FourPeople | 100.00 | 102.39 | 100.18 | 103.50 |
|  | Johnny | 100.00 | 100.91 | 100.45 | 104.92 |
|  | KristenAndSara | 100.00 | 101.64 | 100.27 | 105.83 |
|  | Average | 100.00 | 101.65 | 100.30 | 104.75 |
|  | Average (%) | 100.00 | 103.68 | 100.58 | 105.01 |

It should be appreciated that in practical video transmission applications, the generated bit streams will typically be transmitted into a communication channel which has a bandwidth limit for video streams. Since a mismatch generally exists between the real-time generated bits from video encoding and the bandwidth constraint, a fixed size buffer is often used to temporally store the bits which cannot be transmitted immediately. The buffer sizes are specified differently in different application systems, where different capacity storage devices are required. It can be readily appreciated that the possibility of an occurrence of buffer overflow is highly related not only to the RC method used, but also to the buffer size.

If buffer overflow and undertow instances occur, the video transmission system will typically skip some frames, and then the video decoding performance will degrade and the visual experience of the observers will have a reduction due to the lost information. Therefore, buffer occupancy status control is an important metric to evaluate the RC performance.

Figure 3A:
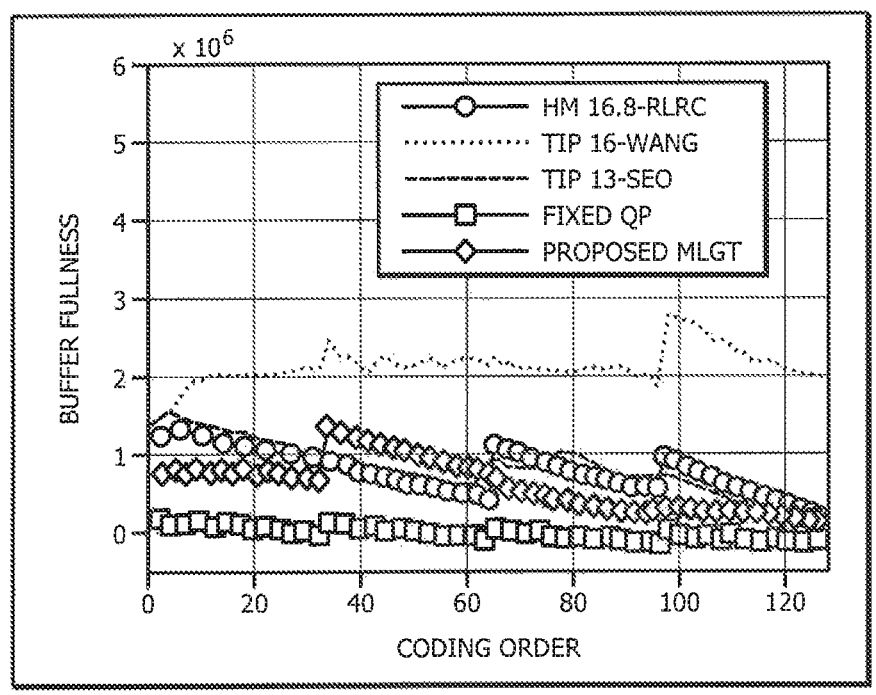
FIGS. 3A-3F illustrate the buffer fullness results of different RC methods, including mug based video coding rate control RC method of the present invention, for comparison.
Figure 3B:
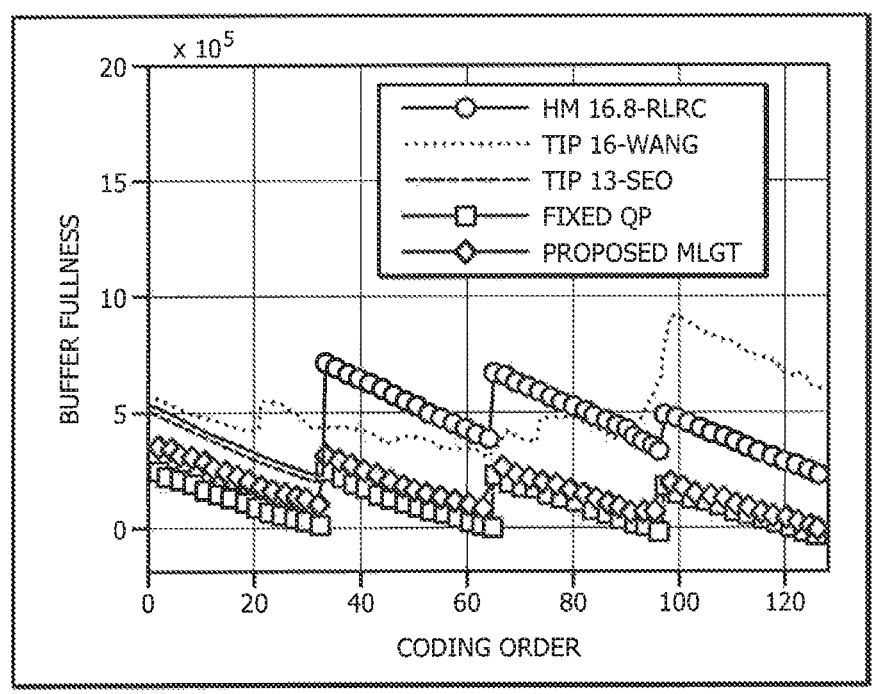
Figure 3C:
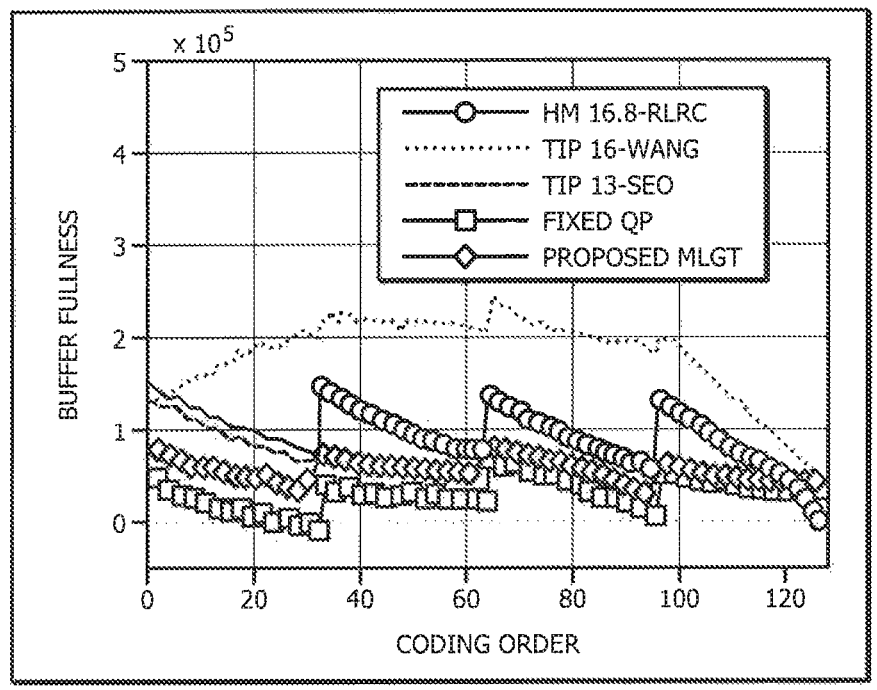
Figure 3D:
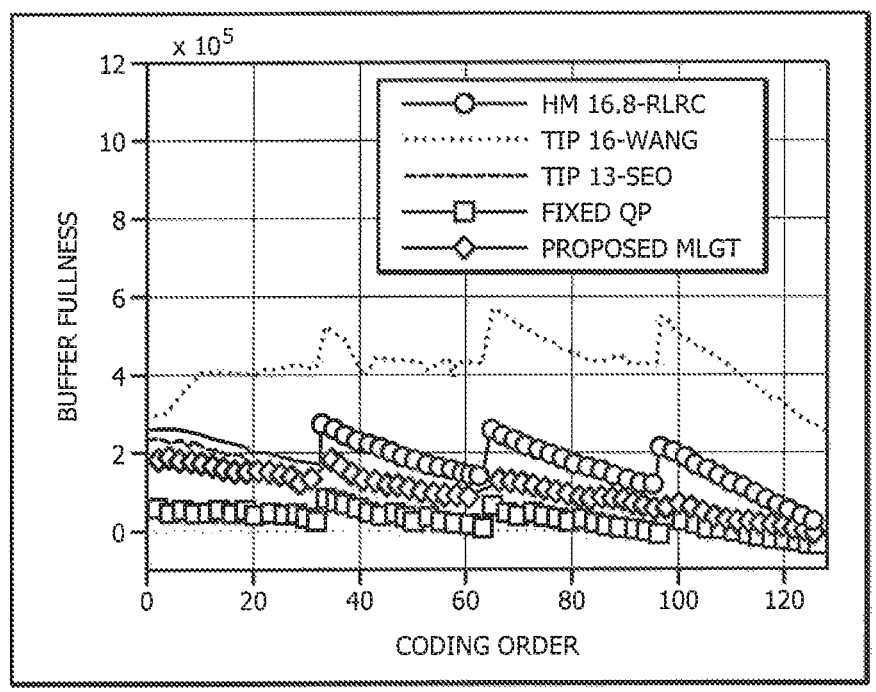
Figure 3E:
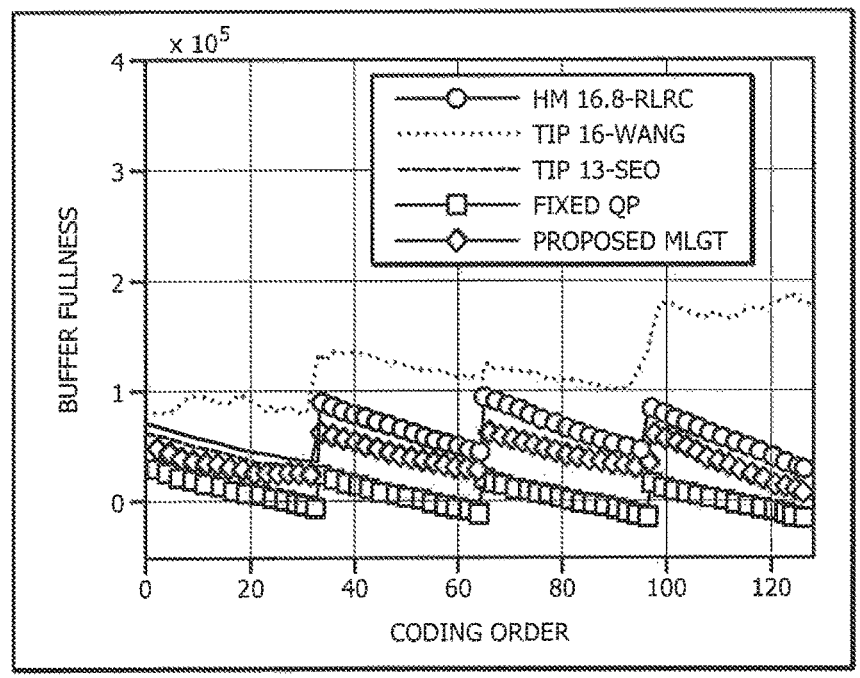
Figure 3F:
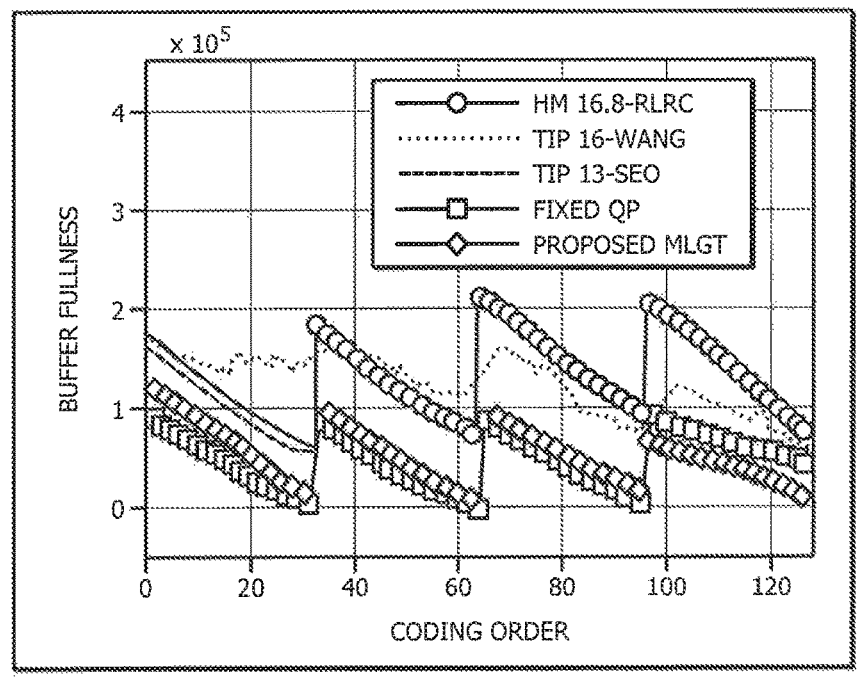

FIGS. 3A-3F illustrate the buffer fullness results of different RC methods. In particular FIG. 3A shows the buffer fullness results for the "PeopleOnStreet" video sequence example of Table I with respect to a 1400 kbps communication channel, FIG. 3B shows the buffer fullness results for the "BQTerrace" video sequence example of Table I with respect to a 700 kbps communication channel, FIG. 3C shows the buffer fullness results for the "BasketballDrill" video sequence example of Table I with respect to a 350 kpbs communication channel, FIG. 3D shows the buffer fullness results for the "RaceHoursesC" video sequence example of Table I with respect to a 350 kbps communication channel, FIG. 3E shows the buffer fullness results for the "BQSquare" video sequence example of Table I with respect to a 125 kbps communication channel, and FIG. 3F shows the buffer fullness results for the "FourPeople" video sequence example of Table I with respect to a 300 kbps communication channel.

As can be seen from the results of FIGS. 3A-3F, the TIP1.6-Wang RC method is the most likely to have more overflow cases. The other two one-pass RC methods (i.e., HM16.8-RLRC and TIP13-Seo) also have much higher buffer occupancy values than the exemplary MLGT RC method. Therefore, they have much higher possibilities to have overflow cases. The exemplary MLGT RC method maintains a lower level buffer occupancy values than all the other one-pass RC methods for most of time, which indicates that it will have much less overflow cases. For the underflow cases, in FIGS. 3A-3F, the FixedQP RC method has a lot of undertow cases while the other RC methods have no underflow cases.

In general, the exemplary MLGT RC method obtained the best performance in buffer occupancy control to avoid overflow and underflow cases, which is very helpful to achieve a high decoding performance and desirable visual experience at the receiver end in the video transmission system.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for video coding Rate Control (RC), the method comprising:
utilizing machine learning to provide selection of different Rate-Distortion (R-D) models of a plurality of R-D models for video coding of different portions of a video stream; and
utilizing game theory modeling in RC bit allocation using the R-D models selected for video coding the different portions of the video stream, wherein the game theory modeling comprises mixed R-D model based cooperative bargaining game theory modeling having a minimum utility adjusted by a reference coding distortion and frame level Quantization parameter (QP) change, wherein the minimum utility is defined by $\{U_{i,d}(r_{i,d}),\ i=1, 2, \ldots, N\}$ where $r_{i,d}$ is a minimum bit consumption to achieve the minimum utility $U_{i,d}$ for frame i of the mixed R-D model based cooperative bargaining game theory modeling.

2. The method of claim 1, wherein the different portions of the video stream comprise Coding Tree Units (CTUs).

3. The method of claim 1, wherein the different portions of the video stream comprise frames.

4. The method of claim 1, wherein R-D models of the plurality of R-D models comprise inter frame Coding Tree Unit (CTU) level R-D models.

5. The method of claim 1, wherein the machine learning is based upon R-D model classification, wherein the machine learning is implemented to select a R-D model of the plurality of R-D models for a current portion of the video stream.

6. The method of claim 5, wherein the plurality of R-D models comprise power function based R-D models with different power orders.

7. The method of claim 6, wherein the plurality of R-D models further comprise at least one R-D model other than the power function based R-D models with different power orders.

8. The method of claim 7, wherein the at least one R-D model other than the power function based R-D models with different powers comprise a R-D model for specially handling video stream portions by estimating consumed bits from a portion of the video stream in a previous collocated portion of the video stream.

9. The method of claim 5, wherein selection of a R-D model of the plurality of R-D models for the current portion of the video stream is based upon support vector machine (SVM) based multi-classification.

10. The method of claim 9, further comprising:
extracting features from the current portion of the video stream and coding results from previous portions of the video stream for the SVM based multi-classification.

11. The method of claim 1, wherein utilizing game theory modeling in RC bit allocation using the R-D models selected for video coding the different portions of the video stream provides Coding Tree Unit (CTU) level bit allocation optimization.

12. The method of claim 1, wherein the mixed R-D model based cooperative bargaining game theory modeling further comprises:
adjusting an intra frame QP and inter frame bit ratio to make inter frames have more bit resources to enhance video visual quality smoothness.

13. The method of claim 1, wherein the mixed R-D model based cooperative bargaining game theory modeling includes a special R-D relationship case for Coding Tree Units (CTUs) presented with a threshold level of SKIP modes in inter frames (SKIP_Most_CTUs), and wherein the mixed R-D model based cooperative bargaining game theory modeling further comprises:
allocating, for CTUs identified as SKIP_Most_CTUs, bits directly from collocated CTUs in a previous frame with a same temporal level; and
setting, for CTUs identified as SKIP_Most_CTUs, the QP using a summation of a QP of the collocated CTU in the previous frame with the same temporal level and a frame level QP increment from the previous frame with the same temporal level to a current frame.

14. The method of claim 1, wherein the mixed R-D model based cooperative bargaining game theory modeling further comprises:
using two-stage remaining bit refinement for Coding Tree Unit (CTU) level bit allocation, wherein remaining bits are used for further bargaining providing bit allocation refinement according to bit weights of different CTUs achieved from the mixed R-D model based cooperative bargaining game theory modeling for more accurate bit rate achievements and bit allocation scheme implementations.

15. The method of claim 1, wherein the mixed R-D model based cooperative bargaining game theory modeling comprises:
utilizing a mixed R-D model based utility function convexity.

16. The method of claim 15, wherein the mixed R-D model based utility function convexity comprises a utility set based on the plurality of R-D models.

17. The method of claim 15, wherein the mixed R-D model based cooperative bargaining game theory modeling comprises:
implementing an iterative solution search to achieve bargaining results.

18. A system for video coding Rate Control (RC), the system comprising:
at least one processor; and
a memory coupled to the at least one processor, wherein the at least one processor is configured:
to implement machine learning based upon Rate-Distortion (R-D) model classification to provide selection of different R-D models of a plurality of R-D models for video coding of different portions of a video stream; and
to implement mixed R-D model based cooperative bargaining game theory modeling in RC bit allocation using the R-D models selected for video coding the different portions of the video stream, wherein a minimum utility of the mixed R-D model based cooperative bargaining game theory modeling is adjusted by a reference coding distortion and frame level Quantization parameter (OP) change, wherein the minimum utility is defined by $\{U_{i,d}(r_{i,d}), i=1, 2, \ldots, N\}$ where $r_{i,d}$ is a minimum bit consumption to achieve the minimum utility $U_{i,d}$ for frame i of the mixed R-D model based cooperative bargaining game theory modeling.

19. The system of claim 18, wherein the different portions of the video stream comprise Coding Tree Units (CTUs).

20. The system of claim 18, wherein the different portions of the video stream comprise frames.

21. The system of claim 18, wherein R-D models of the plurality of R-D models comprise inter frame Coding Tree Unit (CTU) level R-D models.

22. The system of claim 21, wherein the plurality of R-D models comprise two or more power function based R-D models with different power orders and at least one R-D model other than the two or more power function based R-D models with different power orders.

23. The system of claim 22, wherein the at least one R-D model other than the two or more power function based R-D models with different power orders comprise a R-D model for specially handling video stream portions by estimating consumed bits from a portion of the video stream in a previous collocated portion of the video stream.

24. The system of claim 18, wherein the at least one processor is configured:
to implement a support vector machine (SVM) based multi-classification classifier for selecting a R-D model of the plurality of R-D models for a current portion of the video stream.

25. The system of claim 18, wherein the mixed R-D model based cooperative bargaining game theory modeling provides Coding Tree Unit (CTU) level bit allocation optimization.

26. The system of claim 18, wherein the mixed R-D model based cooperative bargaining game theory modeling includes a special R-D relationship case for Coding Tree Units (CTUs) presented with a threshold level of SKIP modes in inter frames (SKIP_Most_CTUs), and, wherein the at least one processor configured to implement mixed R-D model based cooperative game theory modeling is configured:
to allocate, for CTUs identified as SKIP_Most_CTUs, bits directly from collocated CTUs in a previous frame with a same temporal level; and
to set, for CTUs identified as SKIP_Most_CTUs, the QP using a summation of a QP of the collocated CTU in the previous frame with the same temporal level and a frame level QP increment from the previous frame with the same temporal level to a current frame.

27. The system of claim 18, wherein the at least one processor configured to implement mixed R-D model based cooperative game theory modeling is configured:
to use two-stage remaining bit refinement for Coding Tree Unit (CTU) level bit allocation, wherein remaining bits are used for further bargaining providing bit allocation refinement according to bit weights of different CTUs achieved from the mixed R-D model based cooperative bargaining game theory modeling for more accurate bit rate achievements and bit allocation scheme implementations.

28. The system of claim 18, wherein the at least one processor configured to implement mixed R-D model based cooperative game theory modeling is configured to adjust an intra frame QP and inter frame bit ratio to make inter frames have more bit resources to enhance video visual quality smoothness.

29. The system of claim 18, wherein the at least one processor configured to implement mixed R-D model based cooperative game theory modeling is configured to utilize a mixed R-D model based utility function convexity, wherein the mixed R-D model based utility function convexity comprises a utility set based on the plurality of R-D models.

30. A method for video coding Rate Control (RC) for High Efficiency Video Coding (HEVC), the method comprising:
  utilizing machine learning to provide selection of different Rate-Distortion (R-D) models of a plurality of inter frame Coding Tree Unit (CTU) level R-D models for video coding of frames of a video stream, wherein the machine learning is based upon R-D model classification; and
  utilizing mixed R-D model based cooperative bargaining game theory modeling in RC bit allocation using the R-D models selected for video coding different portions of the video stream, wherein a minimum utility of the mixed R-D model based cooperative bargaining game theory modeling is adjusted by a reference coding distortion and frame level Quantization parameter (QP) change, wherein the minimum utility is defined by $\{U_{i,d}(r_{i,d}), i=1, 2, \ldots, N\}$ where $r_{i,d}$ is a minimum bit consumption to achieve the minimum utility $U_{i,d}$ for frame i of the mixed R-D model based cooperative bargaining game theory modeling, and wherein an intra frame QP and inter frame bit ratio are adjusted to make inter frames have more bit resources to enhance video visual quality smoothness.

31. The method of claim 30, wherein the plurality of R-D models comprise two or more power function based R-D models with different power orders and at least one R-D model other than the two or more power function based R-D models with different power orders.

32. The method of claim 30, wherein selection of a R-D model of the plurality of R-D models is based upon support vector machine (SVM) based multi-classification corresponding to a R-D model of the plurality of R-D models.

33. The method of claim 32, further comprising:
  extracting features from a current frame of the video stream and coding results from previous frames of the video stream for the SVM based multi-classification.

34. The method of claim 30, wherein the mixed R-D model based cooperative bargaining game theory modeling comprises:
  utilizing a mixed R-D model based utility function convexity, wherein the mixed R-D model based utility function convexity comprises a utility set based on the plurality of R-D models, and wherein the mixed R-D model based cooperative bargaining game theory modeling implements a solution search to achieve bargaining results.

35. The method of claim 30, wherein the mixed R-D model based cooperative bargaining game theory modeling includes a special R-D relationship case for CTUs presented with a threshold level of SKIP modes in inter frames (SKIP_Most_CTUs), and wherein the mixed R-D model based cooperative bargaining game theory modeling further comprises:
  allocating, for CTUs identified as SKIP_Most_CTUs, bits directly from collocated CTUs in a previous frame with a same temporal level; and
  setting, for CTUs identified as SKIP_Most_CTUs, the QP using a summation of a QP of the collocated CTU in the previous frame with the same temporal level and a frame level QP increment from the previous frame with the same temporal level to a current frame.

36. The method of claim 30, wherein the mixed R-D model based cooperative bargaining game theory modeling further comprises:
  using two-stage remaining bit refinement for CTU level bit allocation, wherein remaining bits are used for further bargaining providing bit allocation refinement according to bit weights of different CTUs achieved from the mixed R-D model based cooperative bargaining game theory modeling for more accurate bit rate achievements and bit allocation scheme implementations.

* * * * *

UNITED STATES PATENT AND TRADEMARK OFFICE
CERTIFICATE OF CORRECTION

PATENT NO. : 10,542,262 B2
APPLICATION NO. : 15/352222
DATED : January 21, 2020
INVENTOR(S) : Wei Gao et al.

It is certified that error appears in the above-identified patent and that said Letters Patent is hereby corrected as shown below:

In the Specification

At Column 4, Line number 15, delete "mug" and replace with --MLTG--.
At Column 10, Line number 21, delete "Class A, C, D, and E" and replace with --Class A, B, C, D, and E--.
At Column 11, Line number 48, delete "BasthallDrill" and replace with --BasketballDrill--.
At Column 12, Line number 1, delete "RID model" and replace with --R-D model--.
At Column 14, Line number 9, delete "C.-J." and replace with --C.-J. Lin,--.
At Column 14, Line number 34, delete "F. L. Bartlett" and replace with --P. L. Bartlett--.
At Column 14, Line number 50, delete "parameter a" and replace with --parameter $\upsilon$--.
At Column 20, Line number 39, delete "U" and replace with --$U_i$--.
At Column 21, Line number 31, delete "and $\xi$ also exhibit" and replace with --and $r_i$ and $\xi$ also exhibit--.
At Column 21, Line number 42, delete "best is" and replace with --best $\xi$ is--.
At Column 22, Line number 26, delete "3: $R_c<g(\xi_{mid})$ and $R_c>g(\xi_{min})$" and replace with --3: if $R_c<g(\xi_{mid})$ and $R_c>g(\xi_{min})$--.
At Column 22, Line number 65, Equation 33, delete "$r_{i,min} = (1=P_{min})r_{i,esi}$" and replace with --$r_{i,min} = (1-P_{min})r_{i,est}$--.
At Column 22, Line number 67, Equation 34, delete "$r_{i,max} = (1+P_{max})r_{i,esi}$" and replace with --$r_{i,max} = (1+P_{max})r_{i,est}$--.
At Column 25, Line number 1, delete "R$\lambda$" and replace with --R-$\lambda$--.
At Column 26, Line number 19, delete "HM16.8-RRC" and replace with --HM16.8-RLRC--.
At Column 26, Line number 25, delete "BIS-SSIM" and replace with --BD-SSIM--.
At Column 27, Line number 52, delete "sacrificing mach more" and replace with --sacrificing much more--.
At Column 28, Line number 58, delete "OP" and replace with --QP--.
At Column 31, Line number 27, delete "undertow" and replace with --underflow--.
At Column 31, Line number 63, delete "undertow" and replace with --underflow--.

Signed and Sealed this
Thirtieth Day of June, 2020

Andrei Iancu
*Director of the United States Patent and Trademark Office*

In the Claims

At Column 34, Claim number 18, Line number 11, delete "(OP)" and replace with --(QP)--.